(12) United States Patent
Li et al.

(10) Patent No.: US 8,377,182 B2
(45) Date of Patent: Feb. 19, 2013

(54) GAS ANTI DIFFUSION ASSEMBLIES

(75) Inventors: Zuojiang Li, Fox Point, WI (US); Scott Payne, West Bend, WI (US)

(73) Assignee: Brady Worldwide, Inc., Milwaukee, WI (US)

(*) Notice: Subject to any disclaimer, the term of this patent is extended or adjusted under 35 U.S.C. 154(b) by 253 days.

(21) Appl. No.: 12/780,430

(22) Filed: May 14, 2010

(65) Prior Publication Data

US 2011/0277638 A1 Nov. 17, 2011

(51) Int. Cl.
*B01D 53/02* (2006.01)

(52) U.S. Cl. .......... 96/134; 55/385.4; 55/385.6; 55/486; 96/154

(58) Field of Classification Search .......... 55/385.6, 55/501, 525, 385.4; 96/4, 14, 131, 134, 135, 96/139, 152, 153, 154, 147, 130; 454/184; 360/97.02, 97.03, 97.04, 99.19
See application file for complete search history.

(56) References Cited

U.S. PATENT DOCUMENTS

| | | | |
|---|---|---|---|
| 4,863,499 A | 9/1989 | Osendorf | |
| 4,889,542 A * | 12/1989 | Hayes | 95/285 |
| 4,957,518 A * | 9/1990 | Brassell | 96/4 |
| 5,030,260 A * | 7/1991 | Beck et al. | 96/139 |
| 5,108,474 A * | 4/1992 | Riedy et al. | 55/485 |
| 5,124,856 A * | 6/1992 | Brown et al. | 360/97.18 |
| 5,130,205 A * | 7/1992 | Vu et al. | 428/475.5 |
| 5,163,870 A * | 11/1992 | Cooper | 454/184 |
| 5,346,518 A * | 9/1994 | Baseman et al. | 96/126 |
| 5,367,417 A | 11/1994 | Brown et al. | |
| 5,417,743 A * | 5/1995 | Dauber | 96/13 |
| 5,593,482 A * | 1/1997 | Dauber et al. | 96/117.5 |
| 5,997,614 A * | 12/1999 | Tuma et al. | 96/4 |
| 6,214,095 B1 * | 4/2001 | Logan et al. | 96/147 |
| 7,306,659 B2 * | 12/2007 | Gorton et al. | 96/134 |
| 2003/0047078 A1 | 3/2003 | Ueki et al. | |
| 2005/0139077 A1 * | 6/2005 | Garikipati et al. | 96/130 |
| 2009/0090245 A1 | 4/2009 | Olszewski | |

* cited by examiner

*Primary Examiner* — Duane Smith
*Assistant Examiner* — Minh-Chau Pham
(74) *Attorney, Agent, or Firm* — Whyte Hirschboeck Dudek SC

(57) ABSTRACT

Gas anti-diffusion assemblies are designed to slow, but not to block, the diffusion of a gas from or to an enclosed space to or from an open space, e.g., to slow the diffusion of air into or out of the housing for a hard disk drive from or out to the exterior of the housing. The assemblies typically have a laminate structure, i.e., are constructed of individual layers adhered or otherwise joined to one another in a stacked arrangement. The assemblies typically comprise alternating layers of polymeric film and adhesive with a mesh layer sandwiched or otherwise positioned within the assembly, and optionally comprises one or both of a filter layer and an absorbent layer.

19 Claims, 18 Drawing Sheets

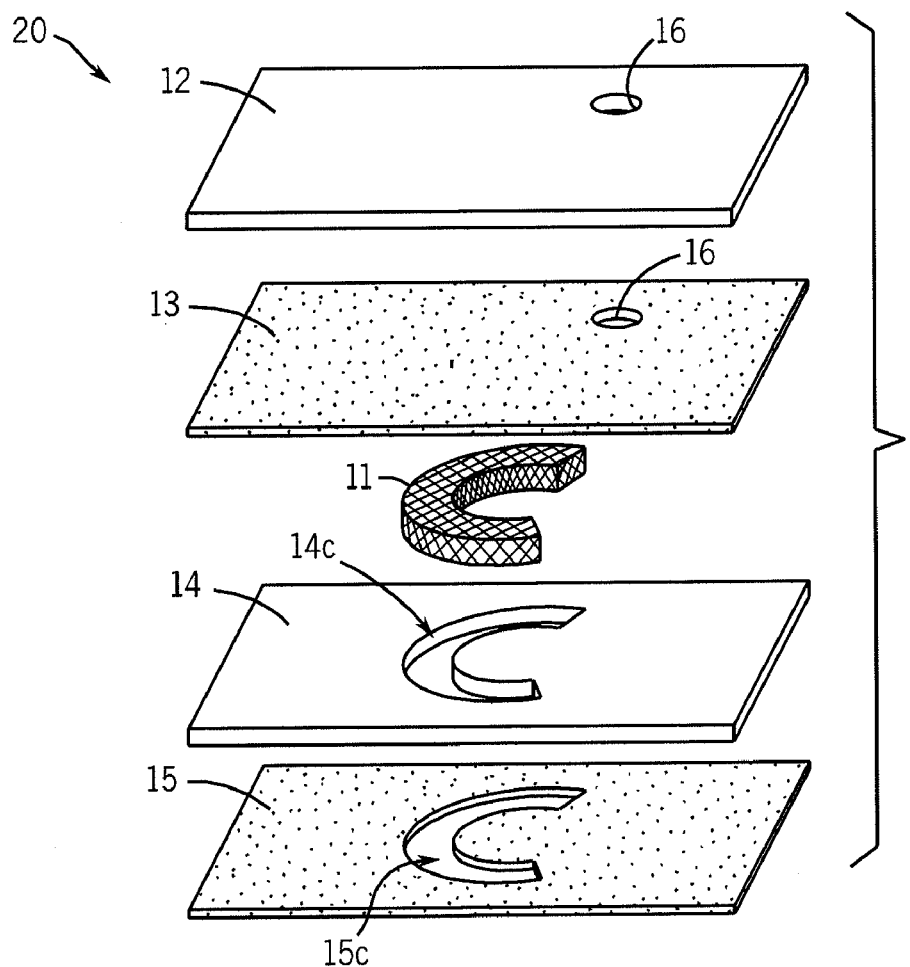
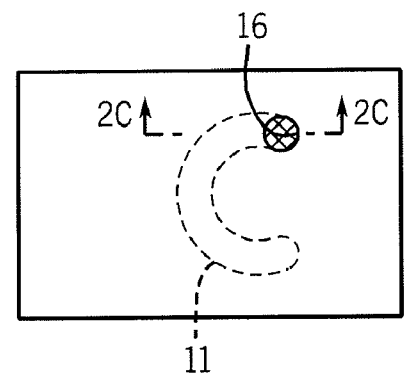
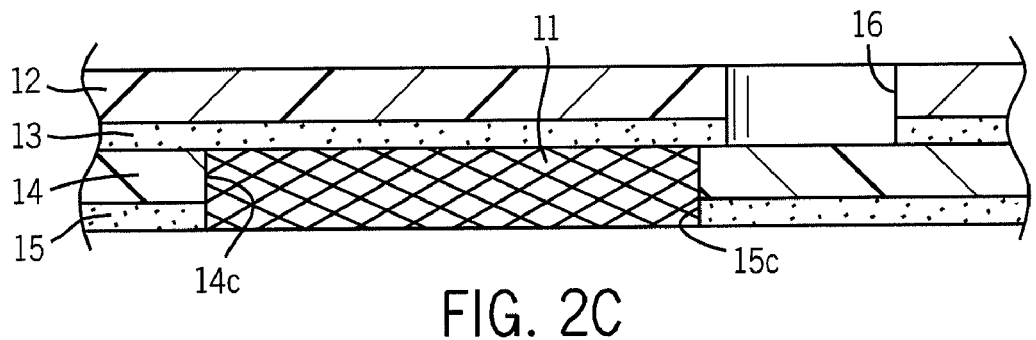

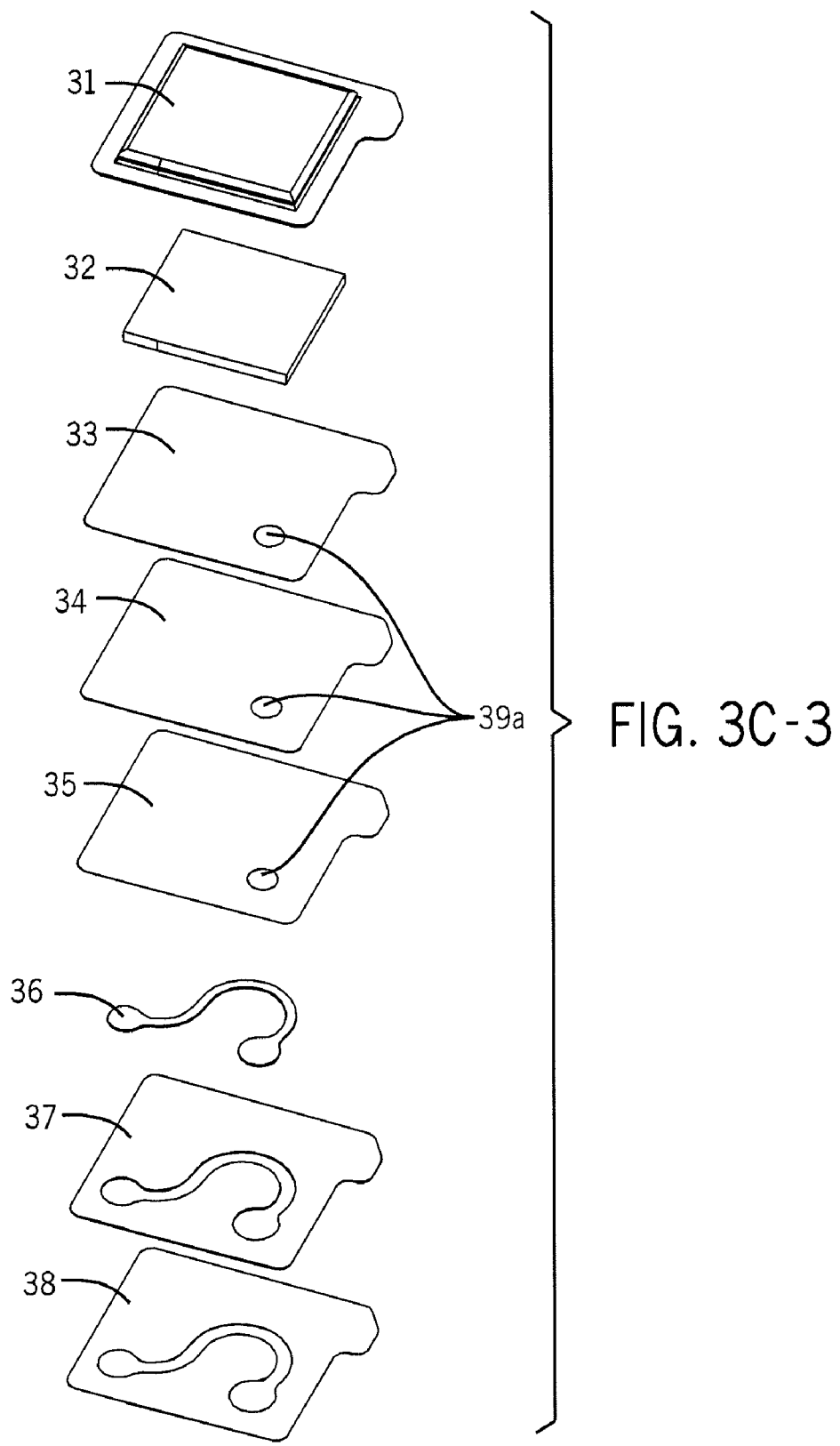

GAS ANTI DIFFUSION ASSEMBLIES

CROSS-REFERENCE TO RELATED APPLICATIONS

None

STATEMENT REGARDING FEDERALLY SPONSORED RESEARCH OR DEVELOPMENT

None

FIELD OF THE INVENTION

This invention relates to gas anti-diffusion assemblies. In one aspect the invention relates to gas anti-diffusion assemblies comprising a filter and/or an absorbent while in another aspect, the invention relates to gas anti-diffusion assemblies without either a filter or an absorbent. In still another aspect the invention relates to a device, typically an electronic device, equipped with the gas anti-diffusion assembly.

BACKGROUND OF THE INVENTION

The use of a filter to control the cleanliness and moisture levels in electronic enclosures, such as hard disk drives, is known. For example, U.S. Pat. No. 4,863,499 teaches an anti-diffusion chemical breather assembly comprising a body, cover and filter media, the latter impregnated with activated charcoal granules. The body and cover define a sealed, tortuous passage or channel which provides fluid communication between the external environment and the hard disk drive interior.

U.S. Pat. No. 5,417,743 teaches a self-adhesive vent filter absorbent assembly for removing gaseous contaminants from an enclosure. The assembly comprises a layer of polymer film forming a diffusion tube, two adhesive layers, at least one filtration layer and, optionally, an absorbent layer.

U.S. Pat. No. 5,593,482 teaches an adsorbent assembly for removing gaseous contaminants from an enclosure, the assembly having an adhesive layer, an adsorbent layer and a filtering layer. An exterior mounted assembly is also provided having an outer layer containing a metal or metallized material that provides an electromagnetic shield to the enclosure.

U.S. Pat. No. 5,997,614 teaches a filter with a channel layer film defining a channel, a boundary layer mounted to at least a portion of the channel layer film and forming a non-adhesive boundary for the channel, and filter media disposed in fluid communication with the channel. The boundary layer typically includes a non-porous or semi-permeable film. The filter is configured and arranged to provide for flow of at least a portion of a fluid along the channel and into the filter media. The filter is used in a device as a filter over a vent in a housing of the device.

In each of these assemblies, gas passes through a well-defined path or channel before entering or after exiting a filter and/or absorbent. While effective at one level in slowing the diffusion of gas within the assembly, an interest remains in alternative designs and/or reducing the gas diffusion rate within the assembly even more.

SUMMARY OF THE INVENTION

In one embodiment the invention is a fluid anti-diffusion assembly designed to slow, but not to block, the diffusion of a fluid, e.g., a gas, from or to an enclosed space to or from an open space, e.g., to slow the diffusion of air into or out of the housing for a hard disk drive from or out to the exterior of the housing. This assembly typically has a laminate structure, i.e., it is constructed of individual layers adhered or otherwise joined to one another in a stacked arrangement.

The assembly comprises one or more polymeric film layers, one or more adhesive layers, a mesh layer and, optionally, a filter layer and/or an absorbent layer. One facial surface of the mesh layer is in contact with an adhesive layer, and in certain embodiments both facial surfaces of the mesh layer are in contact with an adhesive layer. In one embodiment the assembly comprises a mesh layer fitted within a cut-out channel or cavity of one or more of the other layers of the assembly, typically within superimposed, congruent cut-out channels of adjoining polymeric film and adhesive layers. In one embodiment the assembly comprises a mesh layer sandwiched between two other layers of the assembly, typically between a polymeric film layer and an adhesive layer or between two adhesive layers. The assembly further comprises fluid openings such that a fluid, e.g., air, can pass through the assembly and through the mesh layer contained within the assembly.

In one embodiment the invention is a gas anti-diffusion assembly comprising a:
(A) First polymeric film layer not permeable to gas, the film layer comprising first and second facial surfaces;
(B) First adhesive layer comprising first and second facial surfaces, the second facial surface of the first polymeric film layer over and in contact with the first facial surface of the adhesive layer;
(C) Second polymeric film layer not permeable to gas, the second polymeric film layer comprising first and second facial surfaces, the second facial surface of the first adhesive layer over and in contact with the first facial surface of the second polymeric film layer;
(D) Second adhesive layer comprising first and second facial surfaces, the second facial surface of the second polymeric film layer over and in contact with the first facial surface of the second adhesive layer;
(E) Mesh layer comprising first and second facial surfaces, the mesh fitted within a cut-out channel of at least one of the layers of the gas anti-diffusion assembly, or sandwiched between two layers of the gas anti-diffusion assembly, with the proviso that at least one facial surface of the mesh layer is in contact with at least one of the facial surfaces of an adhesive layer;
(F) First fluid opening that extends from and through the first polymeric film layer, through any intervening layers between the first polymeric layer and the mesh layer, to the mesh; and
(G) Second fluid opening that extends from and through the second adhesive layer, through any intervening layers between the second adhesive layer and the mesh layer, to the mesh;
with the proviso that the first and second fluid openings are connected to the mesh layer in a manner such that a passageway is formed that allows a fluid to pass through the gas anti-diffusion assembly by moving into and through the first fluid opening, into and through the mesh layer, and into and out from the second fluid opening.

In one embodiment the invention is a gas anti-diffusion assembly comprising a:
(A) First polymeric film layer not permeable to gas, the film layer comprising first and second facial surfaces;
(B) First adhesive layer comprising first and second facial surfaces, the second facial surface of the first polymeric film layer over and in contact with the first facial surface of the adhesive layer;

(C) Second polymeric film layer not permeable to gas, the second polymeric film layer comprising first and second facial surfaces, the second facial surface of the first adhesive layer over and in contact with the first facial surface of the second polymeric film layer;

(D) Second adhesive layer comprising first and second facial surfaces, the second facial surface of the second polymeric film layer over and in contact with the first facial surface of the second adhesive layer;

(E) Mesh layer comprising first and second facial surfaces and at least one edge surface, the mesh sandwiched between two layers of the gas anti-diffusion assembly, with the provisos that at least one (1) facial surface of the mesh layer is in contact with at least one of the facial surfaces of an adhesive layer, and (2) at least one edge surface of the mesh layer is coterminous with at least one edge surface of each of the two layers between which it is sandwiched; and (F) First fluid opening that extends from and through the first polymeric film layer, through any intervening layers between the first polymeric layer and the mesh layer, to the mesh;

with the proviso that the first fluid opening is connected to the mesh layer in a manner such that a passageway is formed that allows a fluid to pass through the gas anti-diffusion assembly by moving into and through the first fluid opening, into the mesh layer, and out from the mesh layer through the edge of the mesh layer that is coterminous with at least one edge surface of each of the two layers between which it is sandwiched.

In one embodiment the mesh is sandwiched between the first polymeric film layer and the first adhesive layer. In one embodiment the mesh is sandwiched between the first adhesive layer and the second polymeric film layer. In one embodiment the mesh is sandwiched between the second polymeric film layer and the second adhesive layer. In one embodiment the mesh is coextensive with at least one of the layers between which it is sandwiched. In one embodiment the mesh is not coextensive with either of the layers between which it is sandwiched. In one embodiment the mesh is configured as an extended path, either straight, broken (e.g., zigzag) and/or single (e.g., an arc) or multiple curved (e.g., serpentine).

In the embodiment in which at least one edge surface of the mesh layer is coterminous with at least one edge surface of each of the two layers between which it is sandwiched, the second fluid opening is not required because the fluid ingress and egress to the assembly provided by the second fluid opening is provided by the edge surface(s) of the mesh layer that is coterminous with the edge surface(s) of the two layers between which it is sandwiched. This edge surface of the mesh layer provides the other end of the fluid channel through the assembly, the channel comprising the first fluid opening and mesh.

In one embodiment the mesh is fitted into a channel cut-out of one or more of the assembly layers such that at least one facial surface of the mesh is in contact with an adjoining adhesive layer. In one preferred embodiment the mesh is fitted into a channel that is cut out of either the first or second adhesive layer and a channel that is cut out of the second polymeric film layer, one channel superimposed upon the other channel and, preferably, the two channels congruent with one another. In one embodiment the channel cut-outs and mesh are configured as an extended path of any configuration, e.g., straight, broken (e.g., zigzag) and/or single or multiple curved.

If the mesh is fitted into superimposed channels cut out of the second polymeric film layer and the second adhesive layer, and the second adhesive layer serves as the mounting adhesive layer by which the assembly is attached to a substrate, then the facial surfaces of the mesh are in contact with the second facial surface of the adjoining first adhesive layer and the surface of the substrate which is typically non-adhesive.

In one embodiment the mesh is configured as an extended path within the assembly, and the first fluid opening is connected with one end of the mesh layer and the second fluid opening is connected with the other end of the mesh layer such that gas passing through the assembly must traverse essentially the full length of the mesh layer.

In one embodiment the gas anti-diffusion assembly comprises additional polymeric film and/or adhesive layers. In one embodiment the gas anti-diffusion assembly comprises a third polymeric film layer not permeable to gas, the third film layer comprising first and second facial surfaces with the first facial surface in contact with the second facial surface of the of the second adhesive layer, and a third adhesive layer with first and second facial layers with the first facial layer in contact with the second facial surface of the third polymeric film layer.

In one embodiment the invention is a gas anti-diffusion assembly as described above in combination with at least one filter layer or at least one absorbent layer. In one embodiment the filter layer or absorbent layer are positioned over the first or second fluid opening such that gas passing into or out of the assembly must also pass through the filter layer or absorbent layer. The filter layer is designed to collect particulate matter, e.g., dust particles, and the absorbent layer is designed to collect certain gases, e.g., water vapor, volatile organics, acidic fumes, etc. The design of the filter and the absorbent layers can vary to convenience, and each can be a permeable film laminated to the assembly.

In one embodiment the invention is a gas anti-diffusion assembly as described above in combination with at least one filter layer and at least one absorbent layer. The filter and the absorbent layers can be positioned on either side of the assembly or on the same side of the assembly. If one or both are positioned on the side of the assembly attached to the substrate, then the one presenting an external surface to the substrate will carry a mounting adhesive on its external surface. Typically both are positioned on the side of the assembly opposite the side of the assembly mounted to the substrate with the absorbent positioned over the fluid opening that passes through the first polymeric film layer and the filter layer positioned over the absorbent layer. In one embodiment an adhesive joins the filter layer to the absorbent layer in a manner that allows the passage of gas from one layer to the next, e.g., either the adhesive is gas permeable or gas passageways are formed between the filter and absorbent layers. In one embodiment an adhesive joins the absorbent or filter layer to the remainder of the gas anti-diffusion assembly in a manner that does not block the passage of gas into and out of the assembly. Typically, however, the filter layer is not adhered to the absorbent.

In one embodiment the absorbent layer is positioned between and in contact with the filter layer and the first polymeric film layer. In one embodiment an optional adhesive is positioned between and in contact with at least one of the absorbent layer and the filter layer, and the absorbent layer and the first polymeric film layer. In one embodiment an optional permeation scrim layer is positioned between and in contact with both the absorbent and the first polymeric film layers.

The substrate to which the gas anti-diffusion assembly is mounted typically contains at least one vent hole or similar feature, and the assembly is typically mounted to the substrate with a pressure sensitive adhesive and in a manner such that one of the fluid openings of the gas anti-diffusion assembly is in fluid communication with the vent hole.

In all embodiments in which the assembly comprises a filter and/or absorbent layer, the first and second fluid openings extend through their respective layers such that the mesh layer is in fluid communication with the filter layer and/or absorbent layer, and the mesh layer is in fluid communication with an external environment, e.g., the environment within the housing of an electronic device, or the environment in which the electronic device operates.

In one embodiment the second facial surface of the mounting adhesive, e.g., the second or third adhesive layer, is in contact with a release liner. In certain embodiments of the invention, one or more of the adhesive layers are not permeable to gas, e.g., air.

In one embodiment the invention is an electronic device, e.g., hard disk drive, cell phone, digital camera, personal assistant, camcorder or the like, comprising a gas anti-diffusion assembly as described above. In one embodiment the electronic device comprises a housing with a vent hole and the assembly is positioned on the device such that the vent hole and one of the fluid openings of the filter assembly are in fluid communication with one another.

BRIEF DESCRIPTION OF THE DRAWINGS

FIG. 2B is a schematic, top perspective of the assembly of FIG. 2A with the mesh in phantom outline.

FIG. 2C is a schematic, partial cross-section of the assembly of FIG. 2B showing the mesh and adjoining layers in profile.

FIG. 3A-2 is a schematic, partial cross-section of the assembly of FIG. 3A-1 showing the filter, absorbent, mesh, polymeric film and adhesive layers in profile.

FIG. 3A-3 is a schematic, exploded drawing of the assembly of FIGS. 3A-1 and 3A-2.

FIG. 3B-1 is a schematic, top perspective of a variant of the gas anti-diffusion assembly of FIGS. 3A-1, 3A-2 and 3A-3.

FIG. 3B-2 is a schematic of a partial cross-section of the assembly of FIG. 3B-1 showing the filter, absorbent, mesh, polymeric film and adhesive layers in profile.

FIG. 3B-3 is a schematic, exploded drawing of the assembly of FIGS. 3B-1 and 3B-2.

FIG. 3C-1 is a schematic, top perspective of a gas anti-diffusion assembly comprising (i) a mesh fitted within two superimposed, congruent channels cut out of adjoining polymeric and adhesive layers, and (ii) filter and absorbent layers.

FIG. 3C-2 is a schematic of a partial cross-section of the assembly of FIG. 3C-1 showing the filter, absorbent, mesh, polymeric film and adhesive layers in profile.

FIG. 3C-3 is a schematic, exploded drawing of the assembly of FIGS. 3C-1 and 3C-2.

FIG. 3D-1 is a schematic, top perspective of a variant of the gas anti-diffusion assembly of FIGS. 3C-1, 3C-2 and 3C-3.

FIG. 3D-2 is a schematic of a partial cross-section of the assembly of FIG. 3D-1 showing the filter, absorbent, mesh, polymeric film and adhesive layers in profile.

FIG. 3D-3 is a schematic, exploded drawing of the assembly of FIGS. 3C-1 and 3C-2.

FIG. 3E-1 is a schematic, top perspective of another variant of the gas anti-diffusion assembly of FIGS. 3C-1, 3C-2 and 3C-3.

FIG. 3E-2 is a schematic of a partial cross-section of the assembly of FIG. 3E-1 showing the filter, absorbent, mesh, polymeric film and adhesive layers in profile.

FIG. 3E-3 is a schematic, exploded drawing of the assembly of FIGS. 3E-1 and 3E-2.

Like numerals are used to designate like parts throughout the drawings.

DETAILED DESCRIPTION OF THE PREFERRED EMBODIMENT

Figure 1A:
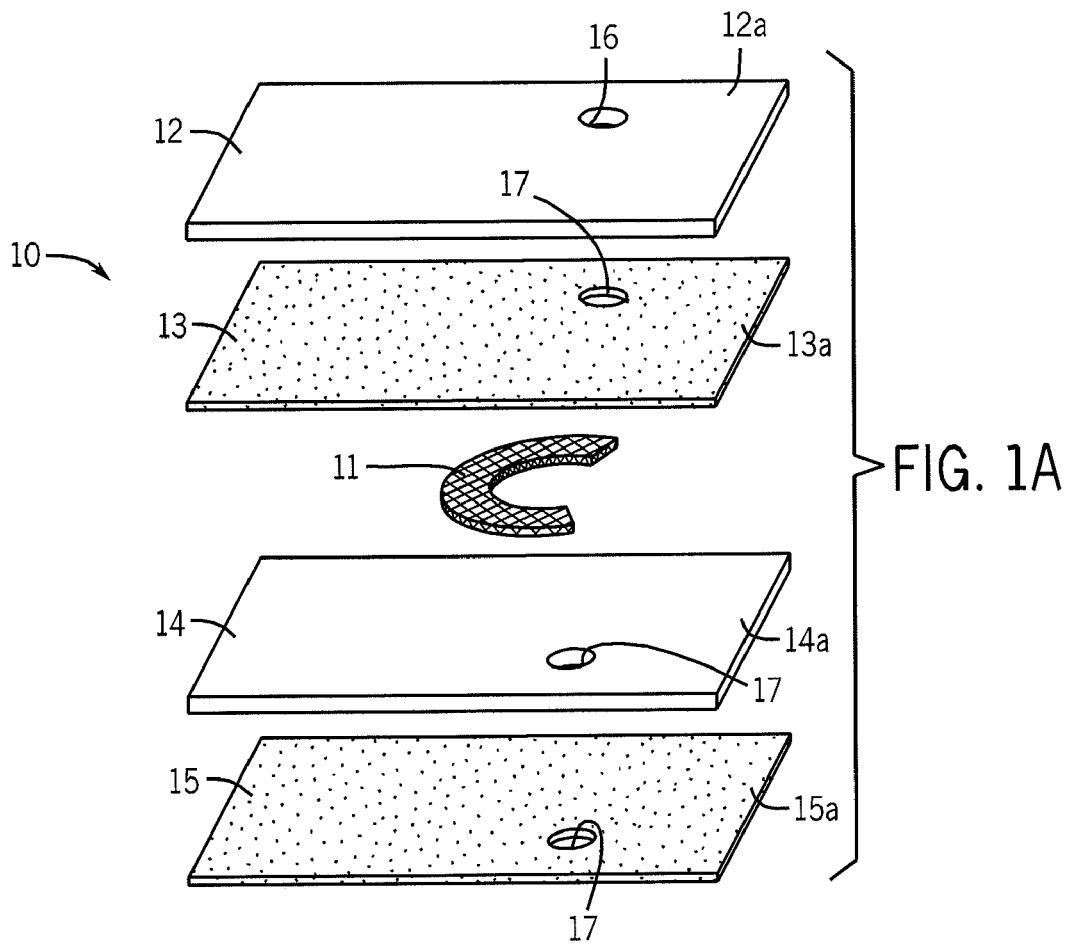
FIG. 1A is a schematic, exploded drawing of an embodiment of the invention in which the gas anti-diffusion assembly comprises (i) a mesh sandwiched between an adhesive layer and a polymeric film layer, but (ii) without either a filter layer or an absorbent layer.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, concentration, thickness, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the thickness of the gas anti-diffusion assembly and its various layers/components.

"Facial surface" and like terms are used in distinction to "edge surface". If rectangular in shape or configuration, a layer, e.g., film, will comprise two opposing facial surfaces joined by four edge surfaces (two opposing pairs of edge surfaces, each pair intersecting the other pair at right angles). If circular in configuration, then the layer will comprise two opposing facial surfaces joined by one continuous edge surface.

"Fluid communication" and like terms mean that a fluid, e.g., a gas, can diffuse from one defined area to another defined area. In the context of the gas anti-diffusion assemblies of this invention, component parts, i.e., layers, of the assembly, or the assembly and the environment, are in fluid communication with one another when a gas can diffuse from one part of the assembly to another part of the assembly, or into and out of the assembly, under normal use conditions, e.g., ambient conditions (23° C. and atmospheric pressure).

"Permeable" and like terms describes a material, e.g., a film, filter, absorbent, scrim, etc., through which a fluid, e.g., a gas, can pass under normal use conditions. "Nonpermeable" and like terms describes a material, e.g., an adhesive, film, etc., through which a fluid cannot pass under normal use conditions.

"Coterminous" and like terms mean that, in the context of the layers of a laminate assembly, one or more edge surfaces of a layer is flush or essentially flush with its immediately adjacent edge surfaces. In the instance of a mesh layer sandwiched between two adjoining layers (both polymeric, or both adhesive, or one polymeric and one adhesive), the edges of the three layers are coterminous if all are open to the environment and the two adjoining layers do not block or significantly impede the fluid communication between the mesh layer and the environment.

FIG. 1A is a schematic drawing of an embodiment of the invention in which the gas anti-diffusion assembly comprises a mesh sandwiched between a polymeric film layer and an adhesive layer. Assembly 10 is shown in exploded format and comprises mesh layer 11 sandwiched between the second facial surface (not shown) of first adhesive layer 13 and first facial surface 14a of second polymeric layer 14. The second facial surface (not shown) of first polymeric layer 12 is joined to first facial surface 13a of first adhesive layer 13. The second facial surface (not shown) of first adhesive layer 13 is joined to first facial surface 14a of second polymeric film layer 14, and the second facial surface (not shown) of second polymeric film layer 14 is joined to first facial surface 15a of second (or mounting) adhesive layer 15.

First polymeric film layer 12 comprises first fluid opening 16 which extends from the environment outside first facial surface 12a of first polymeric film layer 12, through polymeric film layer 12 and first adhesive layer 13 to mesh layer 11 so as to create fluid communication between the environment and the mesh. Second polymeric film layer 14 and second adhesive layer 15 comprise second fluid opening 17 which extends from mesh layer 11, through second polymeric film layer 14 and second adhesive layer 15 to the environment outside the second facial surface (not shown) of second adhesive layer 15 so as to create fluid communication between the mesh and the environment. Mesh layer 11 is sealed between first adhesive layer 13 and second polymeric film layer 14 such that the passage of fluid, e.g., air, between these layers is essentially restricted to passage through mesh layer 11. First and second fluid openings are positioned in the assembly such that one connects to one end of the mesh and the other connects to the other end of the mesh so that gas will pass through all, or essentially all, of the passageway defined by the mesh. Second fluid opening 17 is typically positioned over and in alignment with a vent hole (not shown) of a substrate (not shown), e.g., a housing of an electronic device, such that gas passing from or into the housing through the vent hole must pass through the gas anti-diffusion assembly.

Figure 1B:
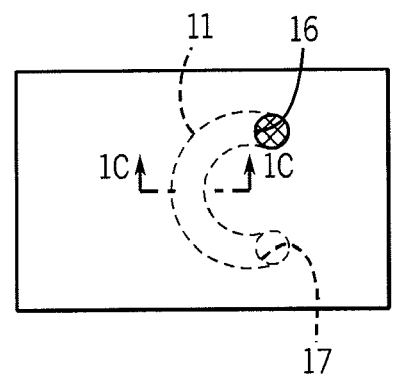
FIG. 1B is a schematic, top perspective of the assembly of FIG. 1A with the mesh in phantom outline.
Figure 1C:
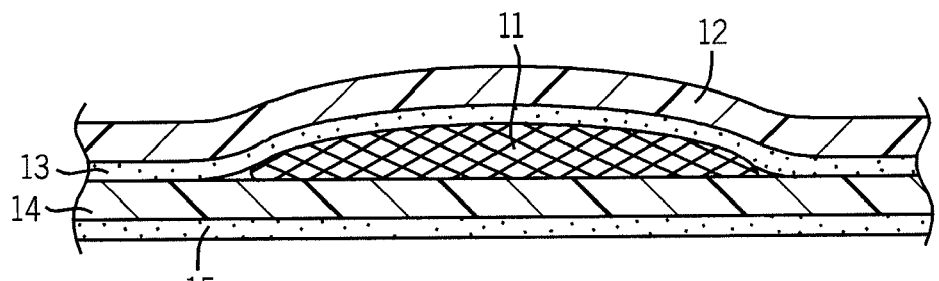
FIG. 1C is a schematic, partial cross-section of the assembly of FIG. 1B showing the mesh and adjoining layers in profile.

FIG. 1B illustrates a top perspective of gas anti-diffusion assembly 10 in an assembled format with mesh layer 11 and second fluid opening 17 shown in phantom outline. FIG. 1C illustrates a partial cross-section of gas anti-diffusion assembly 10 along line 1C-1C in FIG. 1B.

Variations on the design of gas anti-diffusion assembly 10 not shown include (1) positioning mesh layer 11 between first polymeric layer 12 and first adhesive layer 13, (2) positioning mesh layer 11 between second polymeric film layer 14 and second adhesive layer 15, and/or (3) adding one or more polymeric film and/or adhesive layers.

FIG. 2A illustrates a variation on the gas anti-diffusion assembly of FIGS. 1A-C in which second polymeric film layer 14 and second adhesive layer 15 comprise channel cut-outs 14c and 15c, respectively. These channel cut-outs are congruent and superimposed upon one another, and they are typically formed by a single die cut operation after layers 14 and 15 have been joined to one another.

In the embodiment of FIGS. 2A-C, mesh layer 11 is fitted within channel cut-outs 14c and 15c and thus sealed between first adhesive layers 13 and the substrate (not shown). Channel cut-outs 14c and 15c can be of any size, shape and length. The edge surfaces of the channel are formed by second polymeric film layer 14 and second adhesive layer 15, and the facial (top and bottom) surfaces are formed by first adhesive film layer 13 and the top facial surface of the substrate, respectively. Variations on this design include positioning mesh layer 11 in channel cut-outs of first adhesive layer 13 and second polymeric layer 14. Other than moving the mesh from between two layers to within cut-outs of two adjoining layers, the assemblies of FIGS. 1A-C and 2A-C are essentially the same in all other respects, including operation.

FIG. 2B illustrates a top perspective of gas diffusion assembly 20 in an assembled format with mesh layer 11 shown in phantom outline. FIG. 2C illustrates a partial cross-section of gas anti-diffusion assembly 20 along line 2C-2C in FIG. 2B and in this instance, shows the fluid connection between the external environment outside of first polymeric film layer 12 and mesh layer 11. Typically, gas anti-diffusion assembly 20 is positioned over a vent hole of a substrate (neither shown) such that the end of mesh layer 11 that is not aligned with fluid opening 16 is aligned with the vent hole to provide fluid passage of a gas from or to the substrate (e.g., hard disk drive housing), through the assembly, and into or out of the external environment.

Figures 1, 3A:
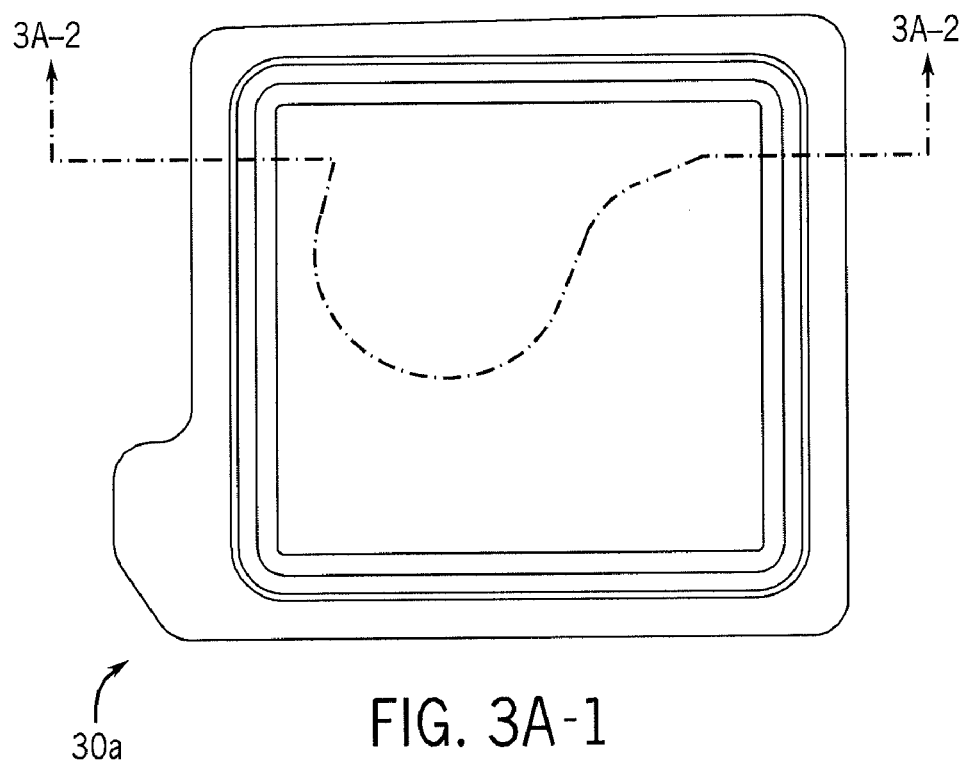
FIG. 3A-1 is a schematic, top perspective of a gas anti-diffusion assembly comprising (i) a mesh sandwiched between an adhesive layer and a polymeric film layer, and (ii) filter and absorbent layers.
Figures 2, 3A:
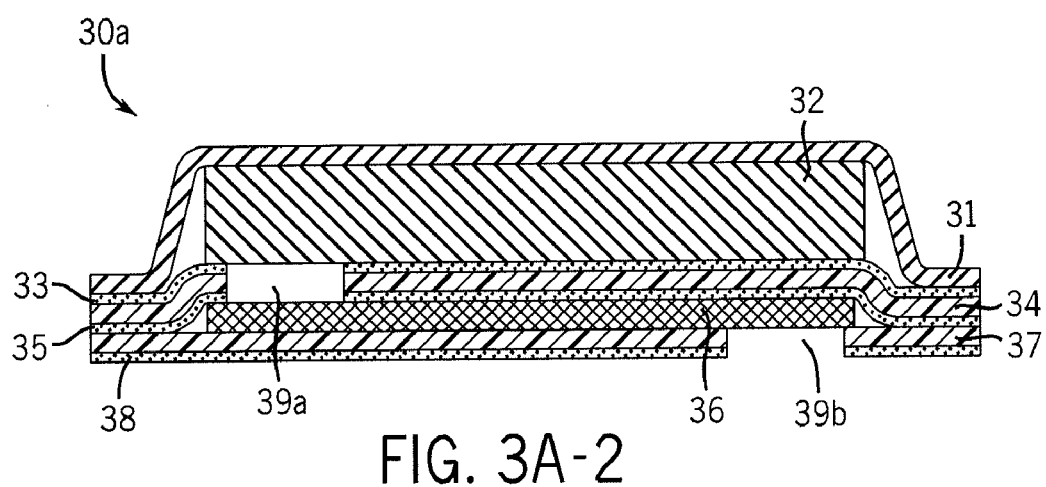
FIG. 2 is a schematic, exploded drawing of an embodiment of the invention in which the gas anti-diffusion assembly comprises (i) a mesh fitted within two superimposed, congruent channels cut out of adjoining polymeric and adhesive layers, but (ii) without either a filter layer or an absorbent layer.
Figures 3, 3A:
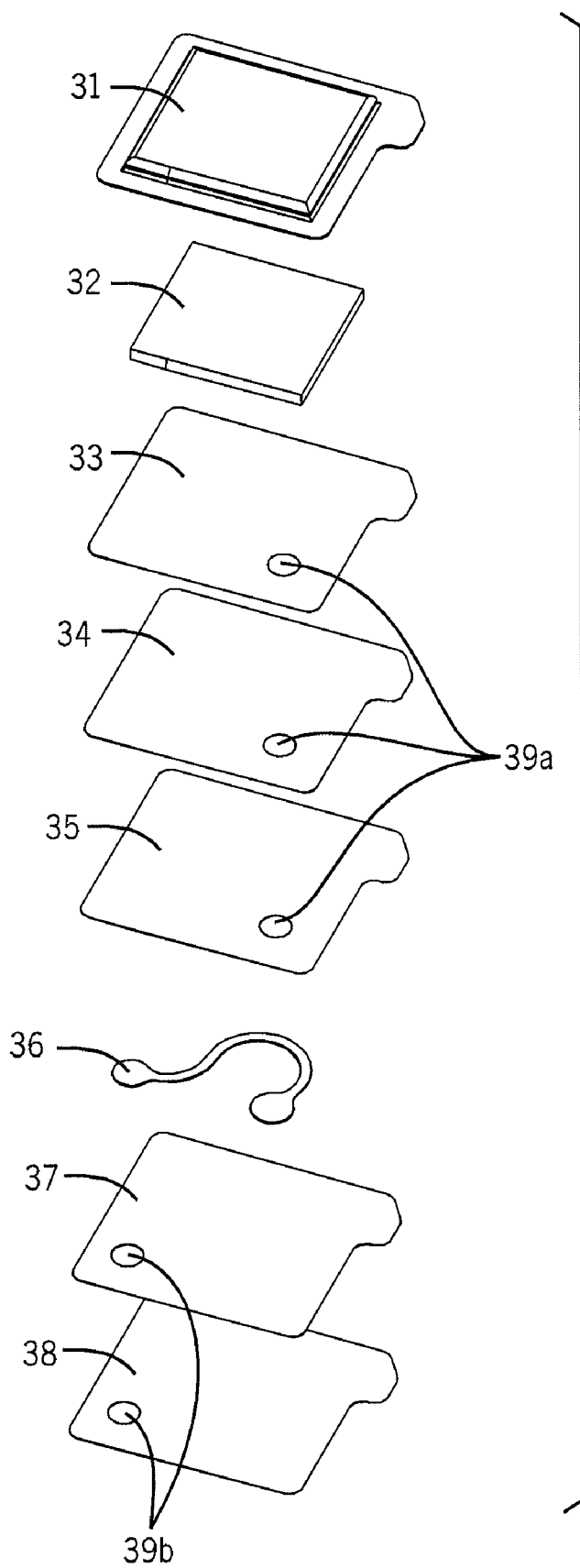
Figures 1, 3B:
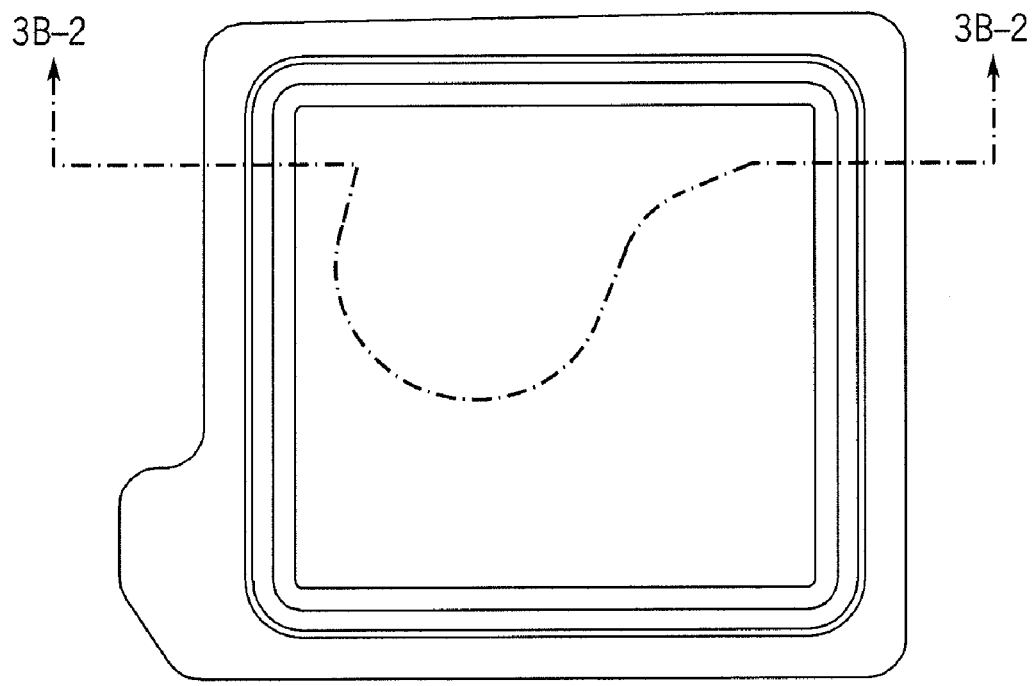
Figures 2, 3B:
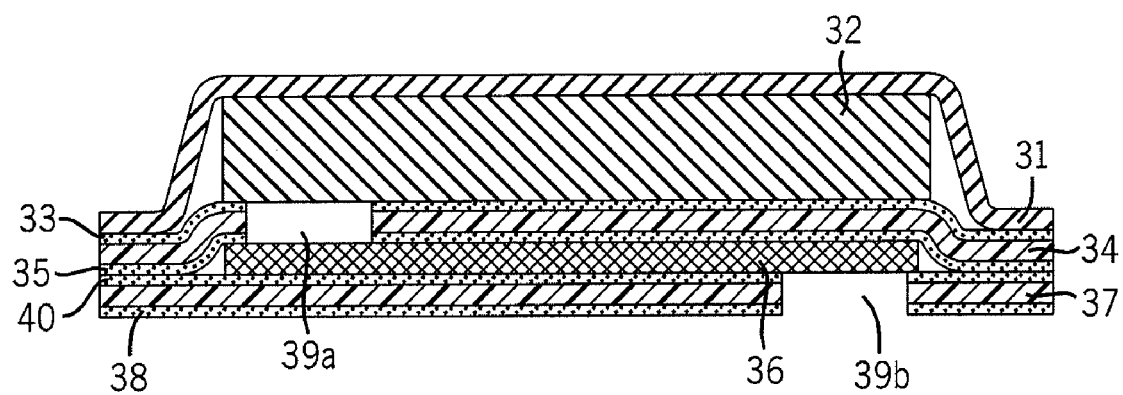
Figures 3, 3B:
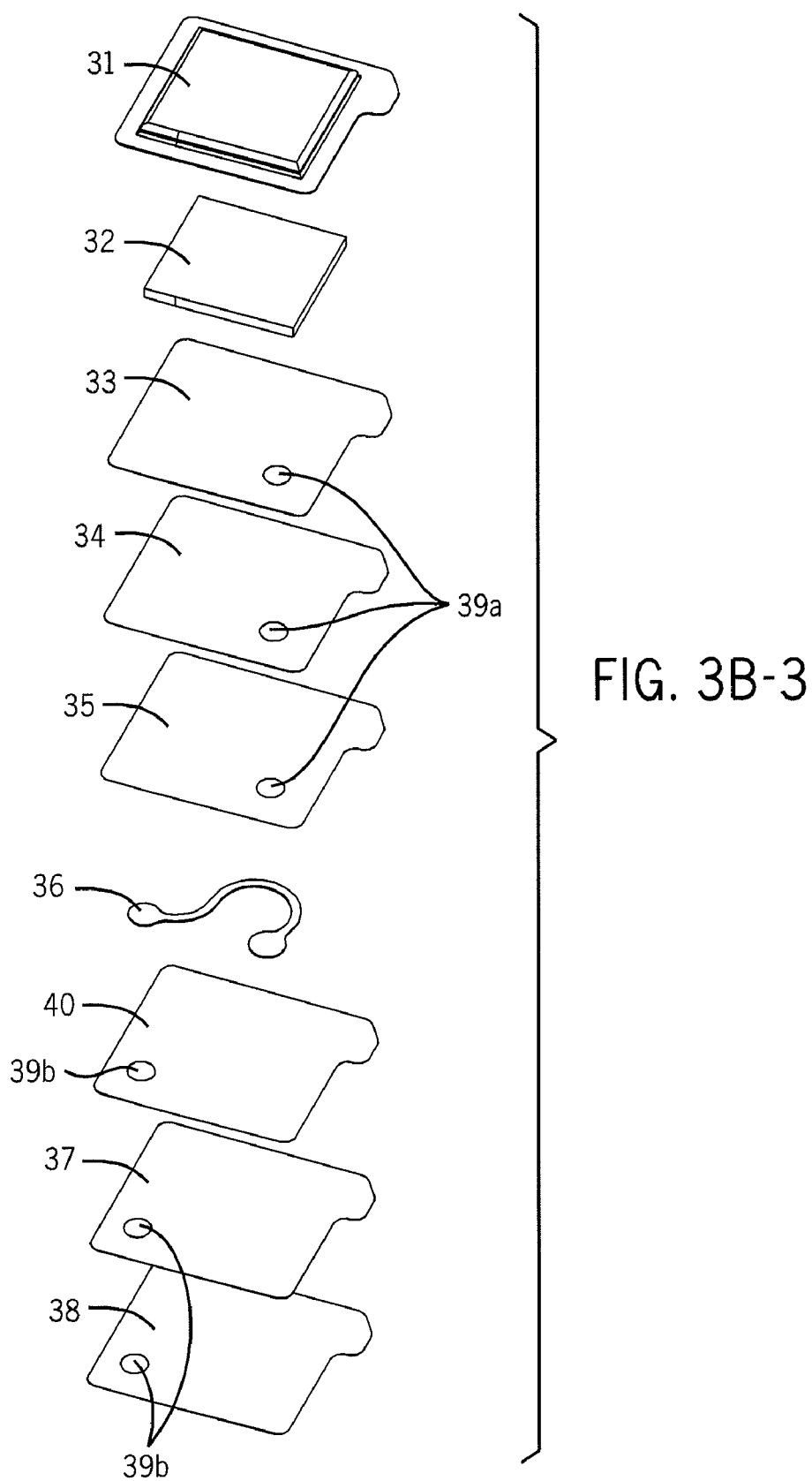
Figures 1, 3C:
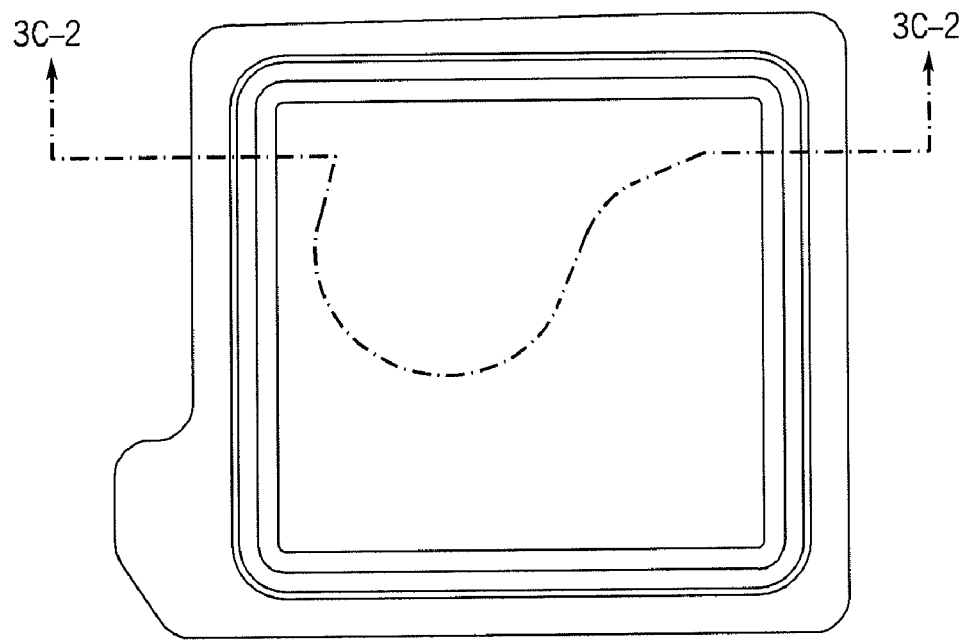
Figures 2, 3C:
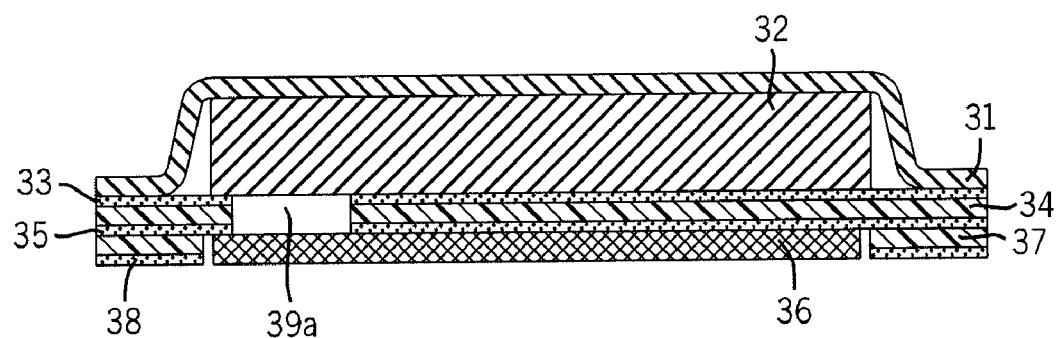

FIGS. 3A-1, 3A-2 and 3A-3 are schematic drawings of an embodiment of the invention in which the gas anti-diffusion assembly includes both a filter layer and an absorbent layer. FIG. 3A-1 shows a top perspective of the assembly, FIG. 3A-2 shows a partial cross-section of the assembly taken at line 3A-1-3A-1, and FIG. 3A-3 shows the assembly in an exploded format.

Assembly 30A comprises filter layer 31 atop and in contact with absorbent layer 32, here shown in the form of a carbon block. Filter layer 31 is designed to trap and hold particles in the range of nanometers or above, especially particles having a size of 0.1 microns and larger. Gases typically pass through the filter layer unless it is designed to capture the gas or vaporous components in the gas e.g., water vapor and/or volatile organic compounds (VOC). However, the filter layer is typically designed to allow all vaporous components of the gas to pass through and into the absorbent, if present. The filter layer can range from 0.01 millimeters (mm) to 2 mm in thickness, and is constructed from any suitable porous polymeric material e.g., expanded, porous polytetrafluoroethylene (PTFE), polypropylene, polyethylene, polyimide, polycarbonate, cellulose ester, nylon etc. and its construction, size and configuration is not critical to this invention. Exemplary filter media includes expanded PTFE available from W. L. Gore & Associate under the brand name "Gore-Tex", and "Poro-Tex" from Dewal Industries.

Any absorbent that will collect and trap air-borne particles not trapped by the filter plus various vaporous compounds, e.g., water vapor, VOCs, acidic fumes, etc., that are likely to egress from or ingress into the enclosure to which the assembly is attached can be used in the practice of this invention. The absorbent can be in the form of fine powder or granular particles, bonded solid agglomerates or a collection of fine particles, beads, film, belt/ribbon, felt, woven or nonwoven cloth, and the like. The adsorbents include porous material for VOCs or acidic gases and desiccant material for moisture. Representative absorbents include, but are not limited to, activated carbon, silica gel, molecular sieves, zeolites, alumina, silica or a combination of two or more of these adsorbents. These adsorbent can also be impregnated with chemicals such as potassium carbonate/bicarbonate, sodium carbonate/bicarbonate, potassium permanganate etc to enhance their adsorption performance for specific gases such as hydrogen chloride, sulfur oxides or nitrogen oxides. The typical thickness of the adsorbent layer is between 0.1 to 10 mm, preferably 0.3 to 3 mm.

Depending upon the nature and structure of the absorbent, an adhesive, typically a permeable adhesive may or may not be used between the filter layer and absorbent layer and/or the absorbent layer and first polymeric film. In FIGS. 3A-2 and 3A-3, an adhesive (or other) layer is not present between filter layer 31 and absorbent layer 32. However, adhesive layer 33 is present between absorbent layer 32 and first polymer layer 34.

Beneath and in contact with first polymeric film layer 34 is second adhesive layer 35 which joins first polymeric film layer 34 to second polymeric film layer 37. Mesh layer 36 in the form of an extended, serpentine path is sandwiched between second adhesive layer 35 and second polymeric film layer 37. First fluid opening 39a, which extends through layers 33, 34 and 35, provides fluid communication between absorbent layer 32 and mesh layer 36.

The mesh material can be selected from a wide variety of materials including, but not limited to, woven or nonwoven fabric and expanded or extruded polymeric material that has openings or interstitial spaces to permit gas to diffuse through it, and the openings are typically in the range of submicrometers to millimeters. The fabric or polymeric material can comprise, among other things, one or more of polyethylene, polypropylene, polyester, polytetrafluoroethylene, polycarbonate, cellulose ester and nylon. Examples of such materials include nonwoven mesh from Fiberweb Inc under sold under the brand names "REEMAY", "TYPAR" and "SYNERGEX", or extruded mesh materials from Delstar sold under the brand name "DELNET".

Beneath and in contact with second polymeric film layer 37 is third adhesive layer 38 which can be protected by a release liner (not shown) until assembly 30A is ready to be mounted to a substrate. This third adhesive layer is also known as the mounting adhesive. Second fluid opening 39b extends through third adhesive layer 38 and second polymeric film layer 37 to provide fluid communication between the environment outside of third adhesive layer 38 and mesh layer 36. The first and second fluid openings are positioned in the assembly such that one opens to one end of mesh layer 36 while the other opens to the other end of mesh layer 36.

FIGS. 3B-1, 3B-2 and 3B-3 are schematic drawings of an embodiment of the invention similar to the embodiment of FIGS. 3A-1, 3A-2 and 3A-3 except a fourth adhesive layer is positioned between second adhesive layer 35 and second polymeric film layer 37. This results in mesh layer 36 sandwiched between two adhesive layers which means that none of the surfaces of mesh layer 36 are in contact with a non-adhesive surface. Second fluid opening 39b also now extends through layers 37, 38 and 40 to provide fluid communication between the environment outside mounting adhesive layer 38 and mesh layer 36.

FIGS. 3C-1, 3C-2 and 3C-3 are schematic drawings of an embodiment of the invention similar to the embodiments of FIGS. 3A-1, 3A-2 and 3A-3 and 3B-1, 3B-2 and 3B-3 except that the mesh is fitted into superimposed, congruent cut-out channels in second polymeric film layer 37 and third or mounting adhesive layer 38. This eliminates the need for second fluid opening 39b because a fluid, e.g., air, can enter and/or exit the assembly directly through the mesh. The assembly of this embodiment is usually positioned on the substrate such that the end of the mesh not aligned with first fluid opening 39a is over a vent hole in the substrate.

FIGS. 3D-1, 3D-2 and 3D-3 are schematic drawings of an embodiment of the invention similar to the embodiments of FIGS. 3C-1, 3C-2 and 3C-3 except that the assembly comprises third polymeric film layer 41 positioned between fourth adhesive layer 40 and second adhesive layer 35. Third polymeric film layer 41 contains channel cut-out 41a, and fourth adhesive layer 40 contains channel cut-out 40a, the cut-outs superimposed upon and congruent with one another. Mesh layer 36 is fitted into the superimposed, congruent cut-out channels. Since the mesh is now inside the assembly, second polymeric film layer 37 and mounting adhesive layer 38 contain second fluid opening 39b aligned with the end of mesh layer 36 not aligned with first fluid opening 39a.

Figures 1, 3D:
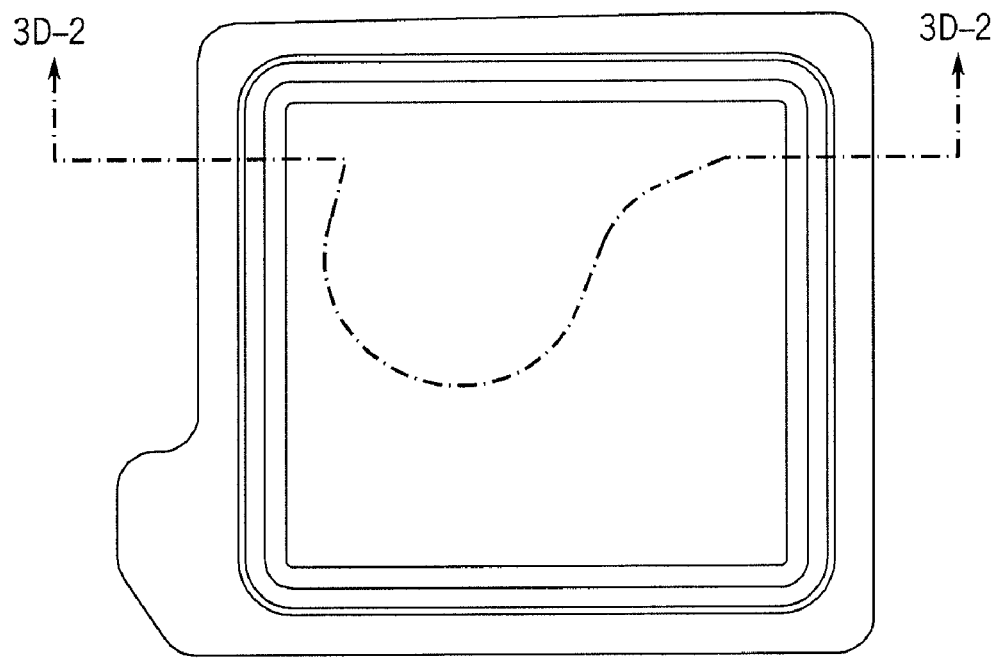
Figures 2, 3D:
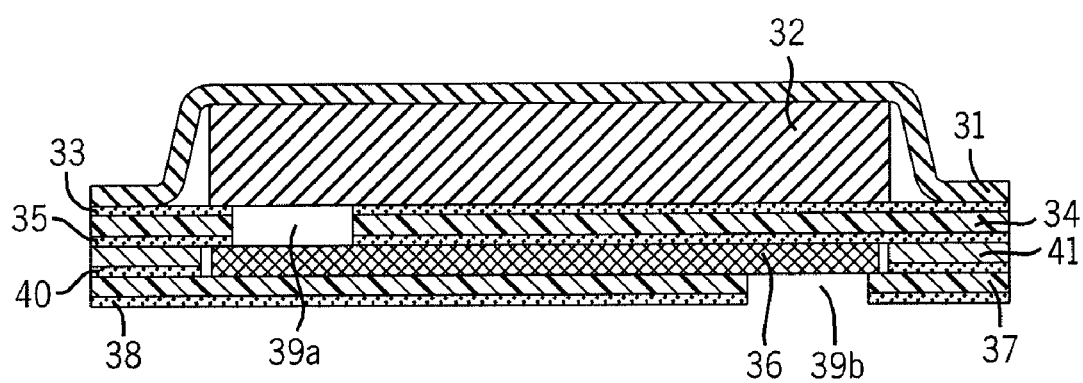
Figures 3, 3D:
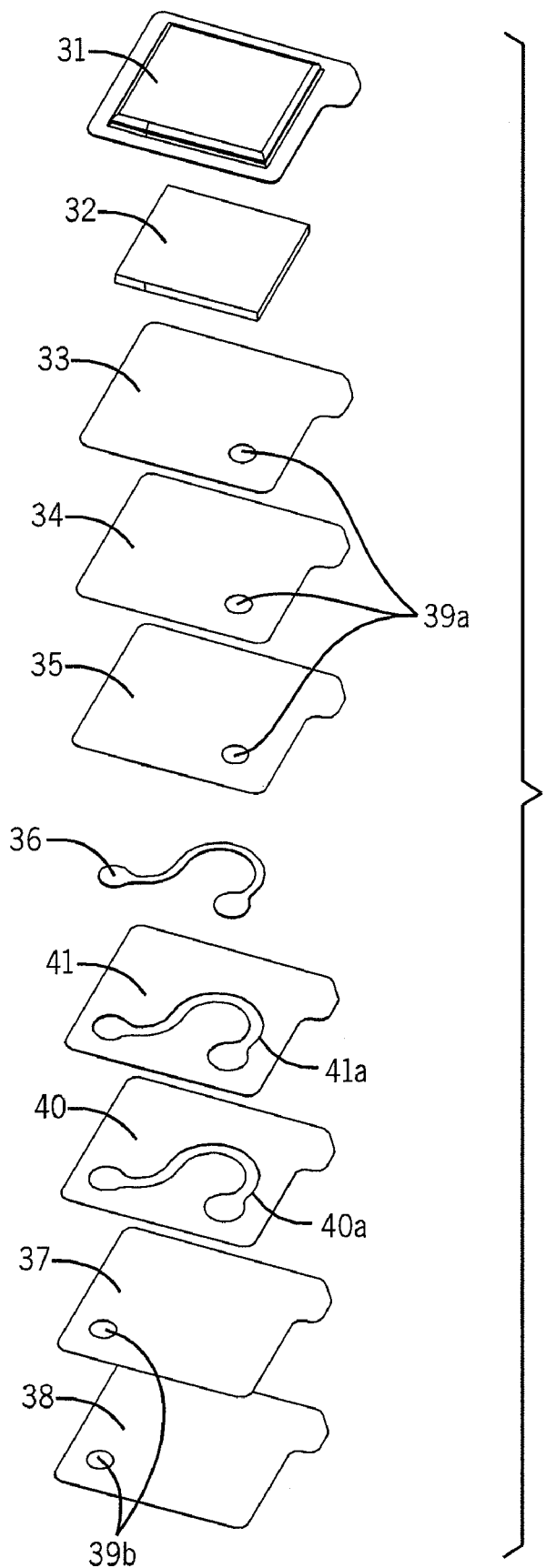
Figures 1, 3E:
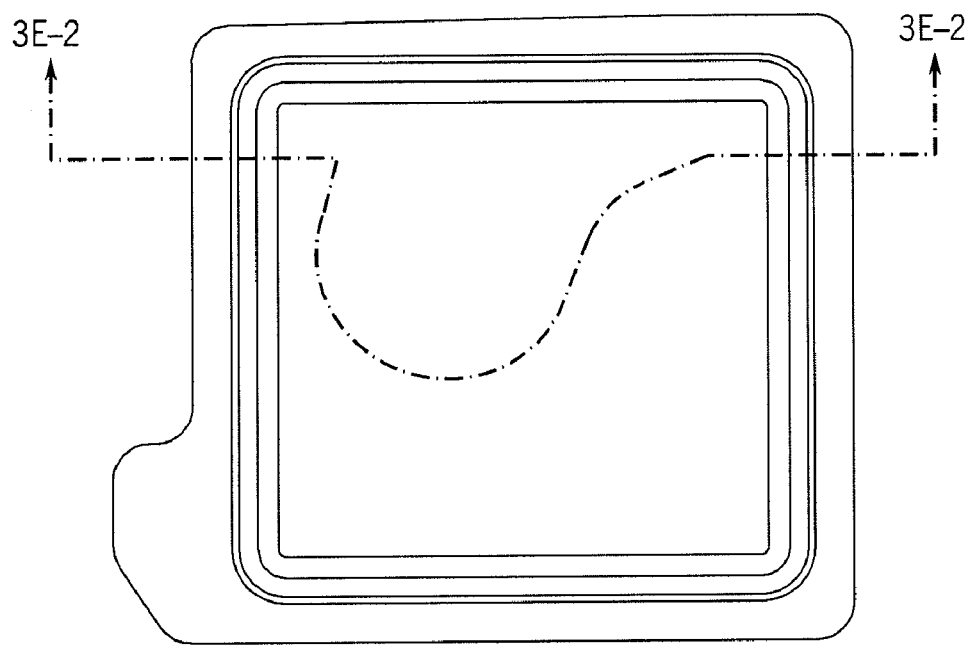
Figures 2, 3E:
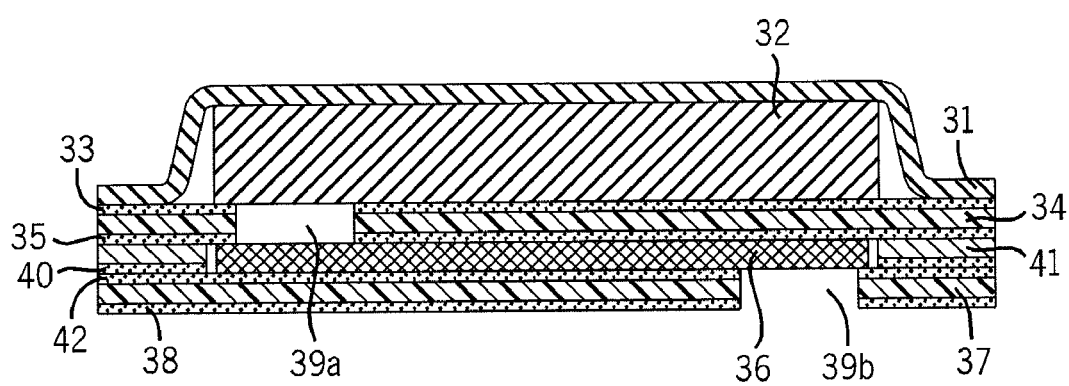
Figures 3, 3E:
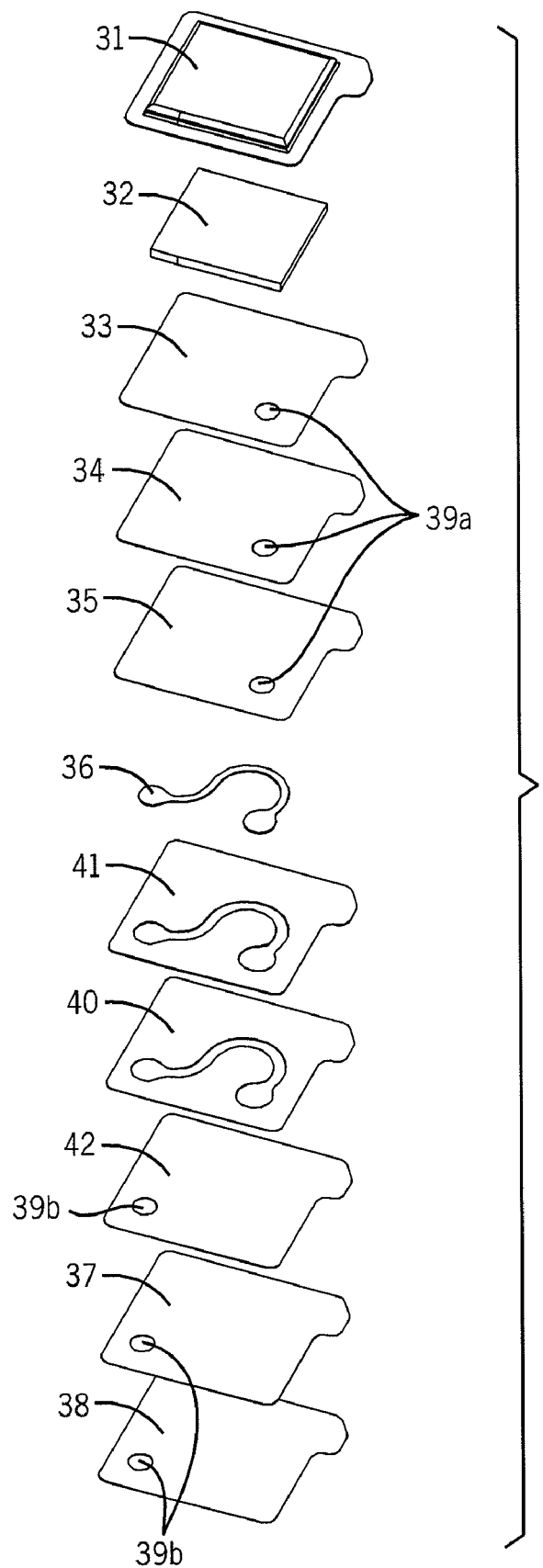

FIGS. 3E-1, 3E-2 and 3E-3 are schematic drawings of an embodiment of the invention similar to the embodiments of FIGS. 3D-1, 3D-2. and 3D-3 except that the assembly comprises fifth adhesive layer 42 positioned between fourth adhesive layer 40 and second polymeric film layer 37. This results in both facial surfaces of mesh layer 36 in contact with an adhesive layer, i.e., adhesive layers 35 and 42. Fifth adhesive layer 42 also contains second fluid opening 39b.

In one preferred embodiment fluid openings 39a and 39b are positioned at opposite ends of the mesh layer in all three dimensions, i.e., width, length and thickness.

The composition of the polymeric films used in the practice of this invention are such that they are nonpermeable to the fluids that may egress from or ingress into the enclosure to which the gas anti-diffusion assembly is attached. Representative of the polymeric films that can be used in the practice of this invention include, but are not limited to, polyester, polyether, polyolefin (e.g., polyethylene, polypropylene, etc.), polyamide, polycarbonate, polyimide and the like. These films can be mono- or multilayer. The thickness of these films (e.g., 34, 37, etc.) will vary with the application of the assembly, but typically for attachment to the inside of a two and one half-inch hard disk drive enclosure, the typical thickness is of 0.001 to 2, more typically of 0.005 to 0.5 and even more typically of 0.01 to 0.3, millimeters (mm). The composition and thickness of polymeric films used in any given gas anti-diffusion assembly of this invention can be the same or different.

The adhesives used in the practice of this invention can vary to convenience, and include both heat-activated and pressure sensitive although the pressure sensitive adhesives (PSA) are preferred. Representative PSAs include both the rubber- and acrylic-based, and the acrylic-based PSAs are the preferred PSAs for use in the practice of this invention. Acrylic-based PSAs are known compounds and widely available. Representative acrylic-based PSAs include but are not limited to: AROSET™ 349M and 1551 (both available from Ashland Chemical Company), ENTROCHEM™ ECA238 (available from Entrotech, Inc.), and BPS 5762 (available from Toyo Inc.). Typically, but not necessarily, all of the adhesive layers, if any, of the gas anti-diffusion assembly are of the same composition and thickness, e.g., 0.001 to 1, more typically 0.001 to 0.2 and even more typically 0.005 to 0.1, mm.

The thickness of the gas anti-diffusion assembly will vary with its intended use, and for assemblies intended for attachment to the inside of a 2.5 or 3.5 inch hard disk drive enclosure, the typical thickness (exclusive of a release liner) is of 0.05 to 40, more typically of 0.2 to 10 and even more typically of 0.5 to 4, mm. The length and width dimensions (and well as its general configuration, e.g., rectangular, circular, etc.) of the assembly will also vary with its intended use, and for gas anti-diffusion assemblies intended for attachment to the inside of a two and one half-inch hard disk drive enclosure, the typical length and width dimensions are 0.5 by 0.5 to 100 by 100, more typically 3 by 3 to 50 by 50 and even more typically 5 by 5 to 40 by 40, mm (and comparable dimensions for non-polygonal shapes).

The purpose of the release liner (not shown in any of the drawings), of course, is to protect the adhesive that will attach the filter assembly to a substrate until the filter assembly is ready for attachment to a substrate. At that time the filter assembly is ready for attachment to a substrate, the liner is simply peeled or otherwise separated from the adhesive and discarded, and the assembly attached to the substrate, typically such that one of the fluid openings to the filter assembly is in fluid communication with the substrate through a vent hole or similar opening. Any conventional release liner can be used in the practice of this invention, and these include such materials as silicone and non-silicone based films and glassine paper.

The structure of the gas anti-diffusion assembly is such that adjacent components of the assembly are in fluid communication with one another, i.e., fluid, typically a gas, e.g., air, can pass through it. The gas can originate from within or without the enclosure. Gas originating from within the enclosure will typically contain emissions from parts within the enclosure that contain low volatile components, e.g., plasticizers that may be present in plastic component parts, sealing adhesives, lubricants from motors and the like. Gas originating outside the enclosure may contain dust particles, water vapor, acidic gases and/or other components that may constitute a threat to the components or their operation within the enclosure. Regardless of its origin, the gas can pass completely through the assembly while various contaminants are captured either by the filter and/or absorbent (if present). With respect to nonpermeable polymeric films, these comprise fluid openings, e.g., perforations, slits, etc., to allow the gas to pass through the permeable components of the assembly, e.g., mesh, scrim, etc., into the absorbent or filter, and then out of the assembly.

Any and all adhesive layers can be either permeable to the fluid or nonpermeable with openings extending through the adhesive to allow passage of the fluid. The number, size and location of the openings in both the nonpermeable polymeric films and the adhesive layers can vary widely and to convenience. Typically the openings in the polymeric films and adhesives, if any, are staggered such that the gas cannot pass directly through the mesh but rather must diffuse at least some minimal lateral distance from an opening in one polymeric film, through the mesh, to an opening in the other polymeric film. Such an arrangement enhances the effectiveness of the assembly to slow diffusion and thus both block or retard entry of contaminants into the enclosure or capture contaminants once in the enclosure.

Important to the practice of this invention is the mesh which acts as anti-diffusion media, e.g. woven, nonwoven, expanded, extruded or molded material, which is sandwiched between two layers of nonpermeable polymeric film to provide restrictive paths for moisture or other gases. Unlike known methods, no well-defined path exists for the gas to travel through the assembly, and thus the gas must travel a tortuous, interstitial route between the spaces between the fibrous or fiber-like components of the mesh.

The gas anti-diffusion assembly is positioned over a vent opening in the enclosure housing. This positioning can be such that the vent is aligned with an opening in the adhesive or polymer film, or staggered from any opening within the assembly such that the gas must travel a minimal lateral distance within the assembly before it can pass into the mesh where it can be directed again in a lateral direction before it can escape from the mesh. The assembly can be placed on the inside or outside of the enclosure, and it can cover one or more vent openings.

Specific Embodiments

Figure 4A:
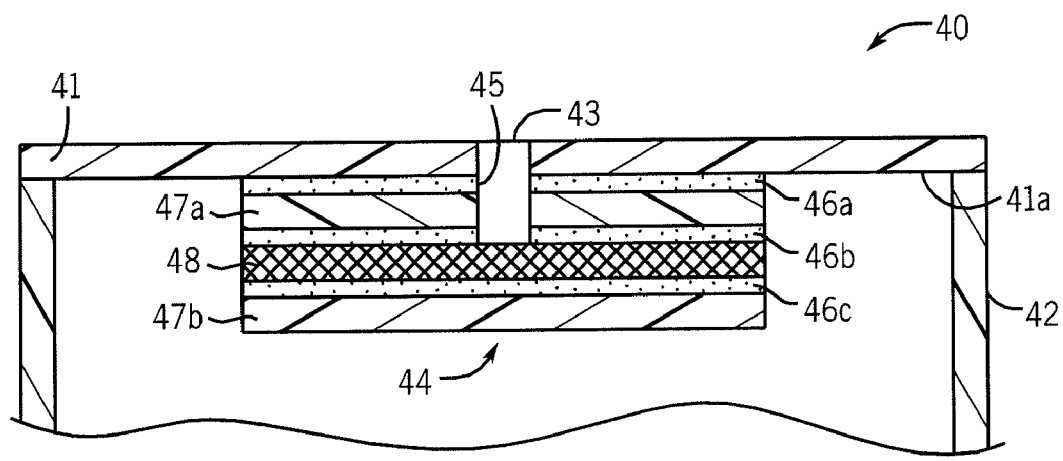
FIG. 4A is a schematic, partial drawing of the test canister used in the examples with a gas anti-diffusion assembly attached to the inside surface of the canister lid.

Rectangular mesh materials are sandwiched between two non-permeable polymer film layers and the whole laminate is attached to a hole (1.6 mm in diameter) in the test canister shown in FIG. 4A. The test canister is exposed to a humidity chamber controlled at 60° C. and 80% relative humidity, and the change of moisture level inside the test canister is tested. The external moisture diffuses into the test canister through the mesh/porous materials which delays the increase in the moisture level inside test canister.

FIG. 4A illustrates test canister 40 (50 mm in diameter, 58 mm in height) which comprises lid 41 in a sealed relationship with housing 42 such that the only ingress/egress for gases is through lid opening 43 in lid 41. Attached to inside surface 41a of lid 41 is gas anti-diffusion assembly 44 such that fluid opening 45 is aligned and in fluid communication with lid opening 43. Assembly 44 comprises first adhesive layer 46a by which the assembly is attached to inside surface 41a of lid 41. First adhesive layer 46a is adjacent to and in contact with first non-permeable film layer 47a which is adjacent to and in contact with second adhesive layer 46b which is adjacent to and in contact with mesh layer 48. Third adhesive layer 46c is adjacent to and in contact with the facial surface of mesh layer 48 opposite the facial surface of mesh layer 48 that is adjacent to and in contact with second adhesive layer 46b, and second non-permeable film layer 47b is adjacent to and in contact with third adhesive layer 46c.

At least one edge surface of mesh layer 48 is coterminous with at least one edge surface of each of second adhesive layer 46b and third adhesive layer 46c such that it is open to the internal environment of canister 40. Fluid opening 45 extends through the first and second adhesive layers and first non-permeable film layer 47a and ends at and in fluid communication with mesh layer 48. Since assembly 44 is not equipped with a second fluid opening to provide fluid communication between mesh layer 48 and the environment within canister 40, gas (in these examples air) enters from and exits to the internal environment of canister 40 through the edge surfaces of mesh layer 48.

Figure 4B:
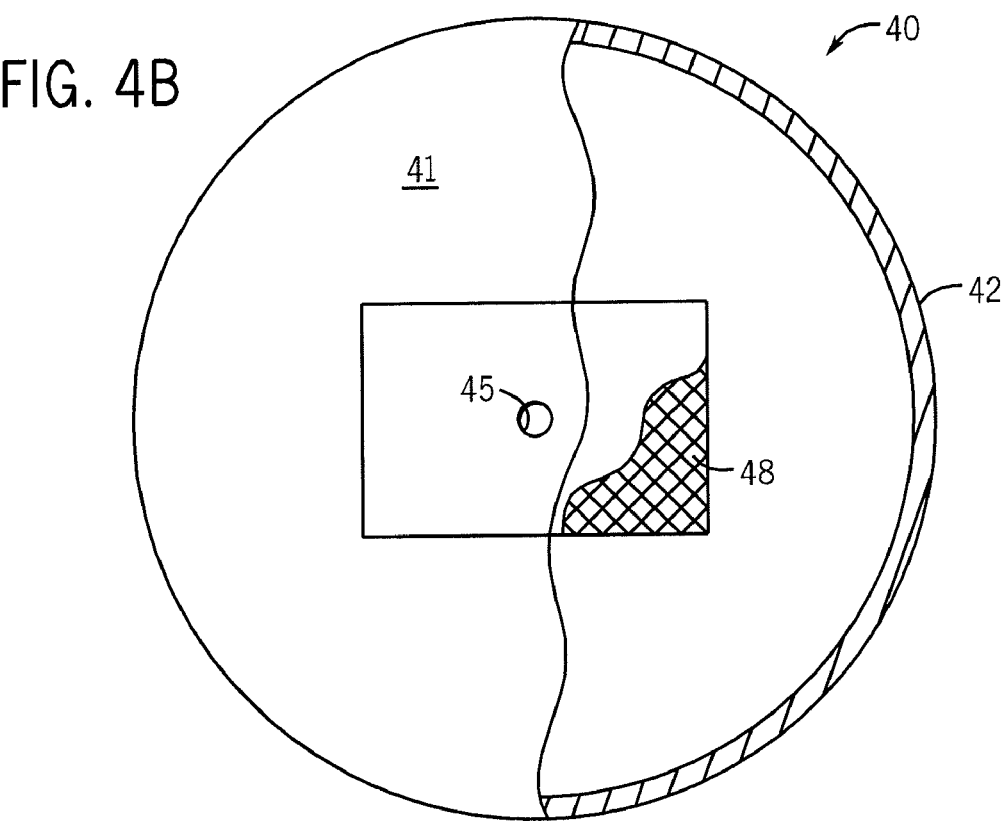
FIG. 4B is a schematic drawing of a top perspective of the test canister of FIG. 4A.

The size of assembly 44 and canister 40 are not drawn to scale. Canister 40 and assembly 44 attached to lid 41 are shown in a top perspective view in FIG. 4B.

Figure 5:
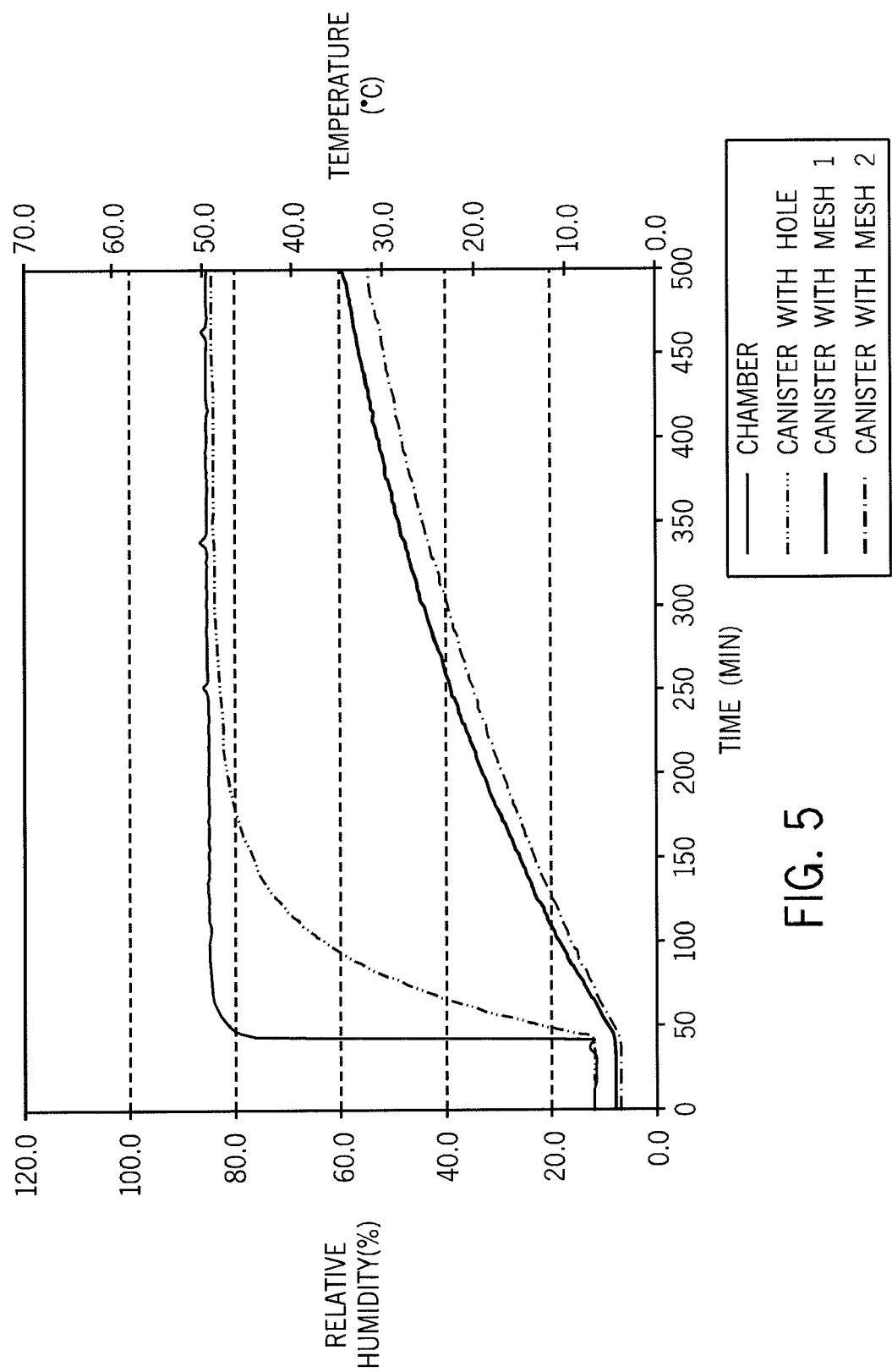
FIGS. 5 and 6 are temperature and humidity versus time charts reporting the results of tests measuring the diffusion of a gas from an external environment to the test canister of FIG. 4A.
Figure 6:
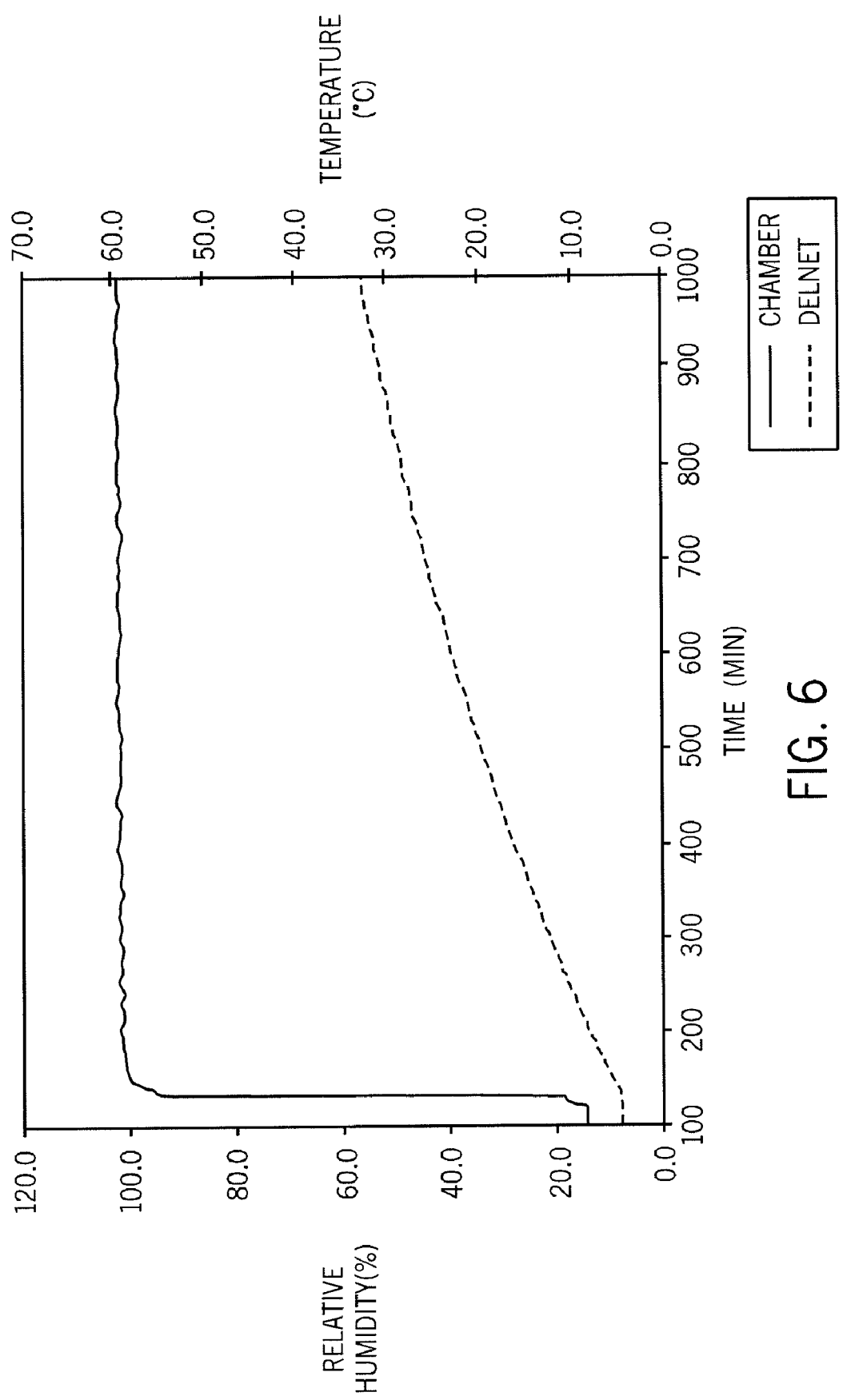

In a typical test the size of mesh patch is 1.5 by 1.8 mm. The flow of 6-14 cc/min under 1 inch water column is the permeation resistance of the structure. FIGS. 5 and 6 report the change of moisture level in the test canister for mesh comprising nonwoven REEMAY 2200 from Fiberweb Filtration (0.3 mm thick, 79.9 g/m$^2$) (FIG. 5) and polypropylene DELNET RB070-30P from Delstar (0.1 mm thick, mesh count 53 by 24 per square inch) (FIG. 6). The assemblies show significant anti-diffusion capacity in comparison to a test canister not equipped with a gas anti-diffusion assembly, i.e., a test canister with just an open hole in the lid.

Figure 7A:
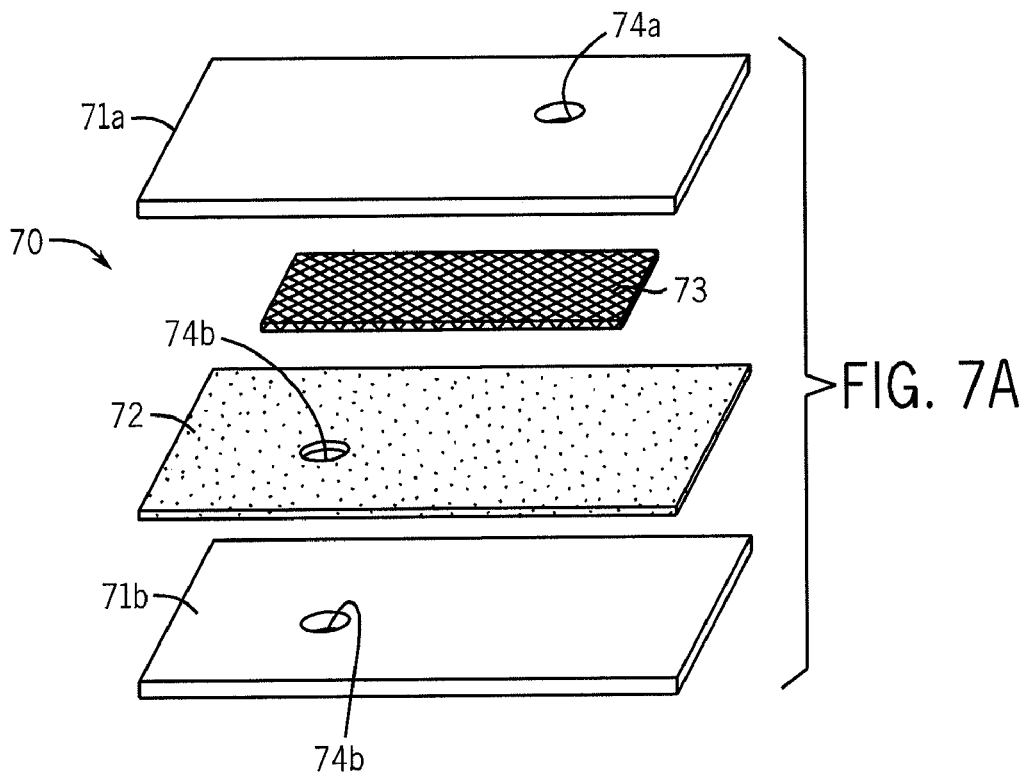
FIG. 7A is a schematic, exploded drawing of an alternative embodiment of a gas anti-diffusion assembly used in the examples.
Figure 7B:
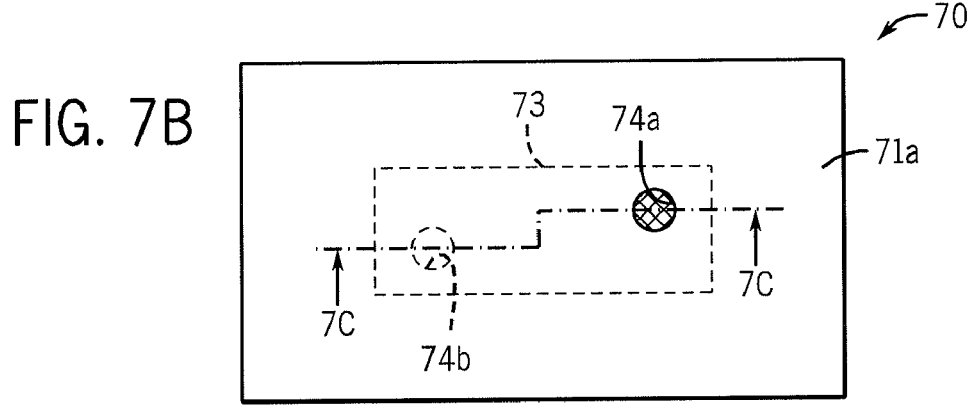
FIG. 7B is a schematic, top perspective drawing of the gas anti-diffusion assembly of FIG. 7A.
Figure 7C:
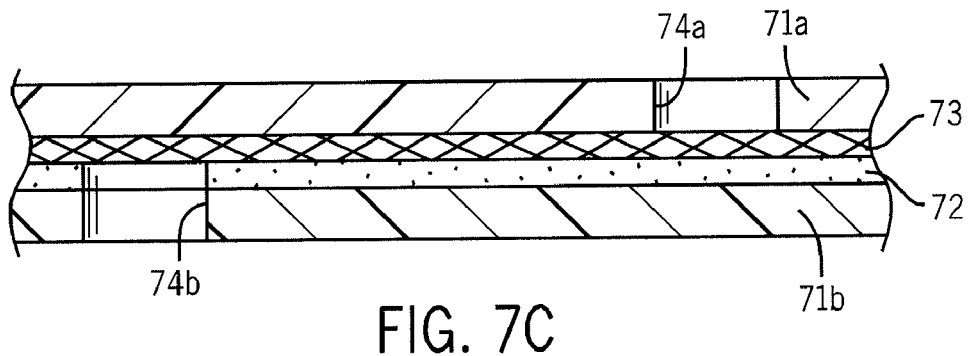
FIG. 7C is a schematic of a partial cross-section of the assembly of FIG. 7B showing the mesh, polymeric film and adhesive layers in profile.

In another example the mesh is sandwiched between two layers of polyester film. Each film has one opening that acts as an entrance and exit for air. The sides of the mesh are sealed such that air is forced to flow through the long-rectangle-shaped mesh. FIG. 7A illustrates in exploded form a typical structure. Gas anti-diffusion assembly 70 comprises non-permeable film layers 71a and 71b joined together by adhesive layer 72. Sandwiched between film layer 71a and adhesive layer 72 is mesh layer 73. Film layer 71a has fluid opening 74a and film layer 71b has fluid opening 74b such that gas that enters an opening must travel essentially the length of the mesh before it can exit through the other opening. Assembly 70 is shown in a top perspective in FIG. 7B, and in a partial cross-section profile in FIG. 7C.

Figure 8:
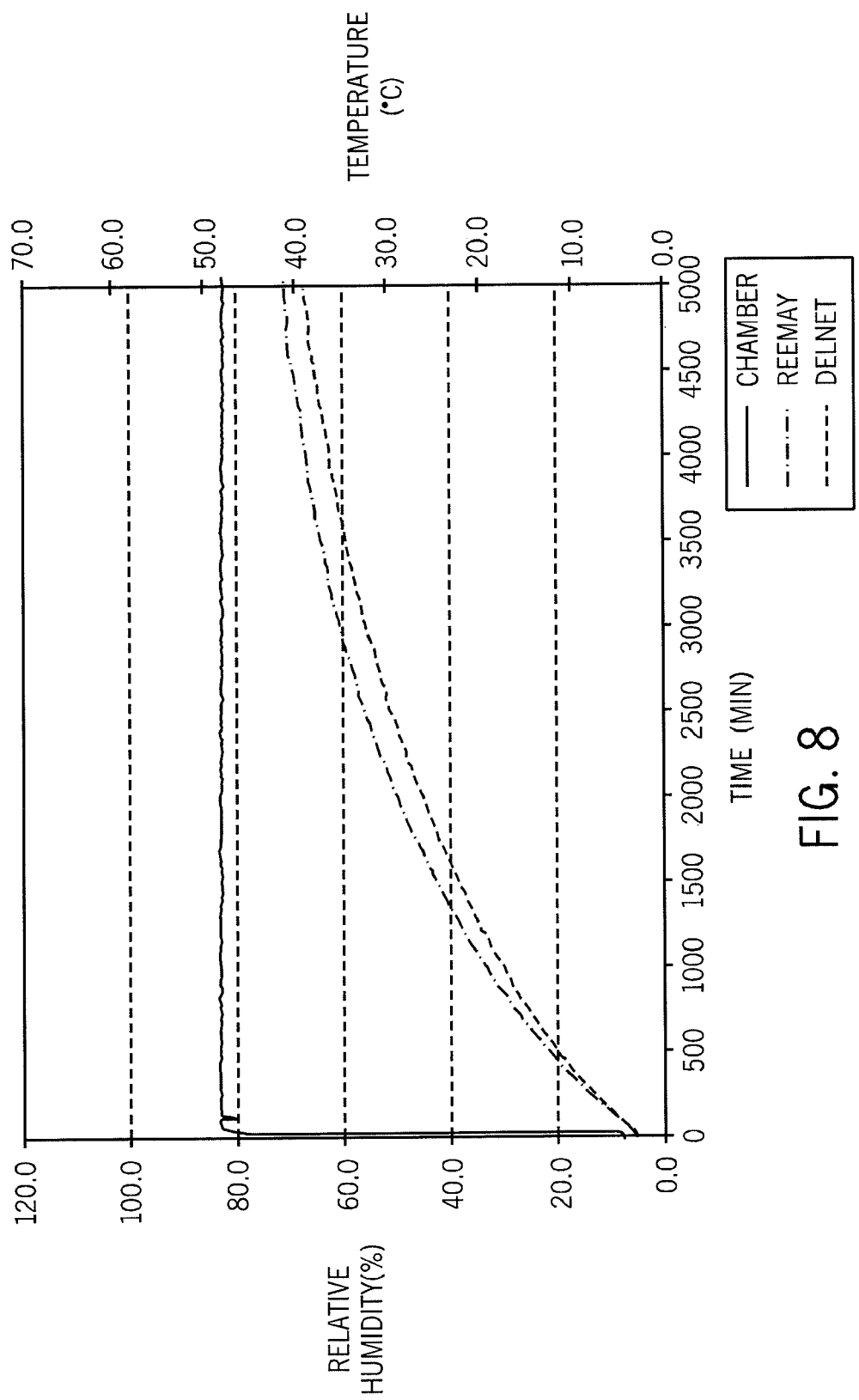
FIG. 8 is a temperature and humidity versus time chart reporting the results of a test measuring the diffusion of a gas from an external environment to the test canister of FIG. 4A equipped with the filter assemble of FIGS. 7A-C.

FIG. 8 reports the change in moisture level inside test canister 40 when equipped with gas anti-diffusion assembly 70 and placed inside a test chamber controlled at 60° C. and 80% relative humidity. In one instance the mesh of the assembly is REEMAY 2200 while in the other instance the mesh of the assembly is DELENT RB0707-30P. In both instances the dimensions of the mesh is 3.8 by 13 mm. Here too, the assemblies show significant anti-diffusion capacity in comparison to a test canister not equipped with an assembly.

Figure 9:
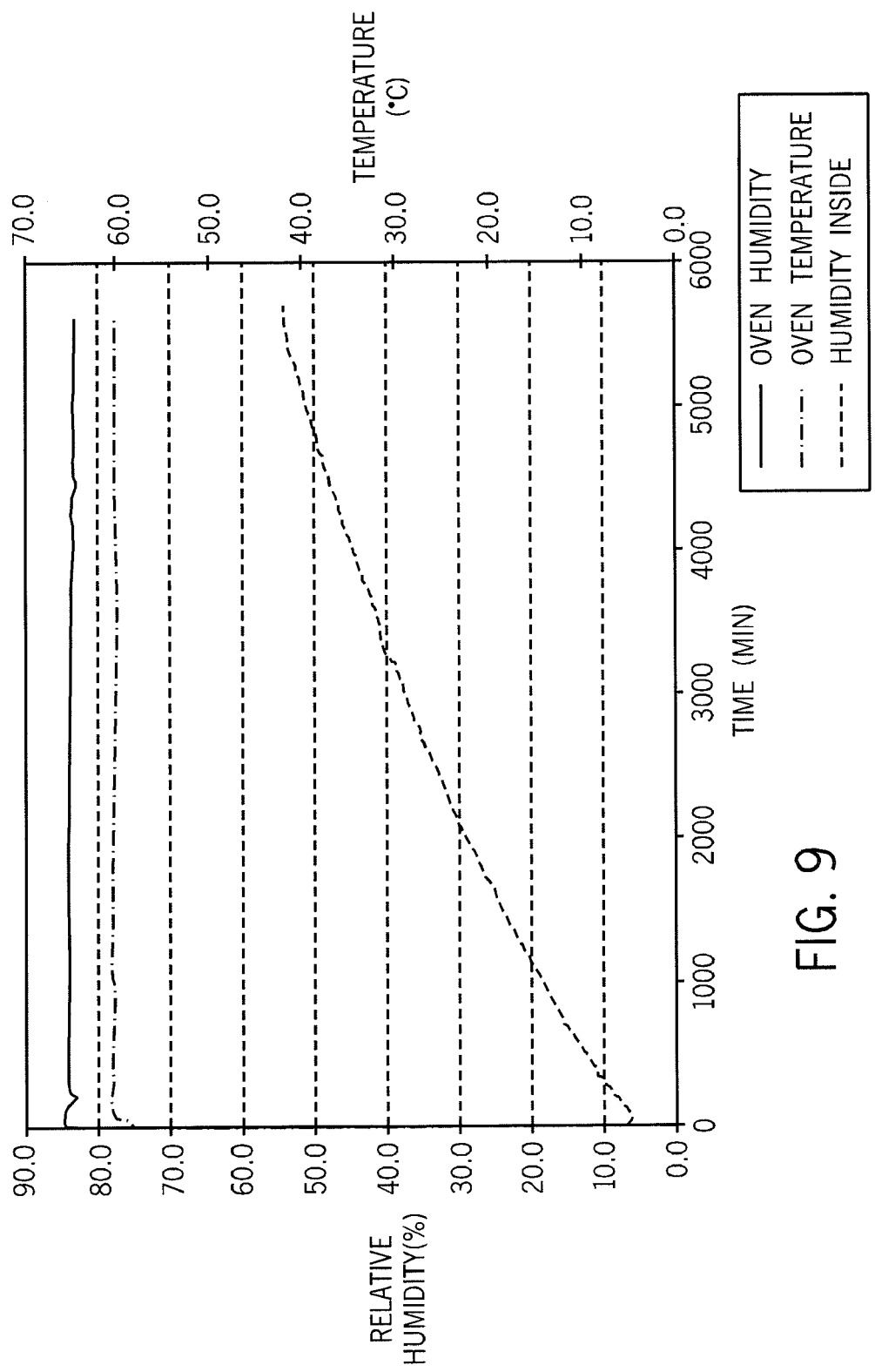
FIG. 9 is a temperature and humidity versus time chart reporting the results of a test measuring the diffusion of a gas from an external environment to the test canister of FIG. 4A equipped with the filter assemble of FIGS. 3E-1, 3E-2 and 3E-3.

FIG. 9 reports the change in moisture level inside test canister 40 when equipped with a gas anti-diffusion assembly as described in FIGS. 3E-1, 3E-2 and 3E-3 sans filter layer 31 and absorbent layer 32. The channel dimensions into which the mesh is fitted are 2.25 mm wide, 1.75 mm deep, and 22 mm long. The mesh material comprises woven polyester fabric (PES 150/45) from Industrial Fabrics. Here again, an assembly of this invention shows significant anti-diffusion capacity.

Although the invention has been described with certain detail through the preceding description of the preferred embodiments, this detail is for the primary purpose of illustration. Many variations and modifications can be made by one skilled in the art without departing from the spirit and scope of the invention as described in the following claims.

What is claimed is:

1. A gas anti-diffusion assembly comprising a:
   (A) First polymeric film layer not permeable to gas, the film layer comprising first and second facial surfaces;
   (B) First adhesive layer comprising first and second facial surfaces, the second facial surface of the first polymeric film layer over and in contact with the first facial surface of the adhesive layer;
   (C) Second polymeric film layer not permeable to gas, the second polymeric film layer comprising first and second facial surfaces, the second facial surface of the first adhesive layer over and in contact with the first facial surface of the second polymeric film layer;
   (D) Second adhesive layer comprising first and second facial surfaces, the second facial surface of the second polymeric film layer over and in contact with the first facial surface of the second adhesive layer;
   (E) Mesh layer comprising first and second facial surfaces and positioned within the assembly such that at least one of the facial surfaces of the mesh layer is in contact with a facial surface of an adhesive layer;
   (F) First fluid opening that extends from and through the first polymeric film layer to and provides fluid communication with the mesh layer; and
   (G) Second fluid opening that extends from and through the second adhesive layer to and provides fluid communication with the mesh layer;
   With the provisos that (1) the first and second fluid openings are connected to the mesh in a manner such that a passageway is formed that allows a gas to pass through the gas anti-diffusion assembly by moving into and through the first fluid opening, into and through the mesh layer, and into and out from the second fluid opening, and (2) the mesh layer is configured as an elongated path with the first fluid opening terminating at or near one end of the mesh layer and the second fluid opening terminating at or near the opposite end of the mesh layer.

2. The gas anti-diffusion assembly of claim 1 in which the mesh layer is sandwiched between two layers of the assembly.

3. The gas anti-diffusion assembly of claim 1 in which the mesh layer is fitted within a cut-out channel of at least one of the layers of the assembly.

4. The gas anti-diffusion assembly of claim 1 in which the mesh layer is fitted into superimposed, cut-out channels in two adjoining layers of the assembly.

5. The gas anti-diffusion assembly of claim 4 in which the superimposed, cut-out channels are congruent with one another.

6. The gas anti-diffusion assembly of claim 1 further comprising a filter layer comprising first and second facial surfaces.

7. The gas anti-diffusion assembly of claim 1 in which the second facial surface of the filter layer is positioned above the first facial surface of the first polymeric layer.

8. The gas anti-diffusion assembly of claim 7 further comprising an absorbent layer (i) comprising first and second surfaces, and (ii) is positioned between the filter layer and the first polymeric film layer such that the first surface of the absorbent is in contact with the second surface of the filter layer and the second surface of the absorbent layer is positioned above the first surface of the first polymeric film.

9. The gas anti-diffusion assembly of claim 7 in which the polymeric films comprise at least one of polyester, polyether, polyolefin, polyamide, polycarbonate and polyimide.

10. The gas anti-diffusion assembly of claim 9 in which the filter layer comprises one or more of expanded, porous polytetrafluoroethylene, polypropylene, polyethylene, polyimide, polycarbonate, cellulose ester and nylon.

11. The gas anti-diffusion assembly of claim 10 in which the mesh comprises woven, nonwoven, expanded, extruded or molded material that has openings to permit gas to diffuse through it.

12. The gas anti-diffusion assembly of claim 11 with a total thickness of 0.05 to 40 mm.

13. The gas anti-diffusion assembly of claim 1 in which the mesh layer is sandwiched between the first adhesive layer and second polymer layer.

14. The gas anti-diffusion assembly of claim 1 in which the mesh layer is fitted into superimposed, cut-out channels in the second polymeric layer and second adhesive layer.

15. The gas anti-diffusion assembly of claim 8 in which the absorbent layer comprises activated carbon, silica gel, molecular sieves, zeolites, alumina, silica or a combination of two or more of these adsorbents.

16. An electronic device comprising the assembly of claim 1.

17. The electronic device of claim 16 as a hard disk drive, cell phone, personal assistant, digital camera, camcorder or an electronic instrument.

18. A gas anti-diffusion assembly comprising a:
(A) First polymeric film layer not permeable to gas, the film layer comprising first and second facial surfaces;
(B) First adhesive layer comprising first and second facial surfaces, the second facial surface of the first polymeric film layer over and in contact with the first facial surface of the adhesive layer;
(C) Second polymeric film layer not permeable to gas, the second polymeric film layer comprising first and second facial surfaces, the second facial surface of the first adhesive layer over and in contact with the first facial surface of the second polymeric film layer;
(D) Second adhesive layer comprising first and second facial surfaces, the second facial surface of the second polymeric film layer over and in contact with the first facial surface of the second adhesive layer;
(E) Mesh layer comprising first and second facial surfaces and at least one edge surface, the mesh sandwiched between two layers of the gas anti-diffusion assembly, with the provisos that at least one (1) facial surface of the mesh layer is in contact with at least one of the facial surfaces of an adhesive layer, and (2) at least one edge surface of the mesh layer is coterminous with at least one edge surface of each of the two layers between which it is sandwiched; and
(F) First fluid opening that extends from and through the first polymeric film layer, through any intervening layers between the first polymeric layer and the mesh layer, to the mesh;
with the provisos that (1) the first fluid opening is connected to the mesh layer in a manner such that a passageway is formed that allows a fluid to pass through the gas anti-diffusion assembly by moving into and through the first fluid opening, into the mesh layer, and out from the mesh layer through the edge of the mesh layer that is coterminous with at least one edge surface of each of the two layers between which it is sandwiched, and (2) the mesh layer is configured as an elongated path with the first fluid opening terminating at or near one end of the mesh layer and the second fluid opening terminating at or near the opposite end of the mesh layer.

19. The gas anti-diffusion assembly of claim 18 further comprising at least one of a filter layer and an absorbent layer.

* * * * *